United States Patent Office 3,046,304 Patented July 24, 1962

3,046,304

COUPLING OF HALOGENATED ORGANIC COMPOUNDS

Robert Neville Haszeldine, Cambridge, England ("Windyridge," Lyme Road, Disley, Cheshire, England)

No Drawing. Filed Aug. 29, 1957, Ser. No. 680,915
Claims priority, application Great Britain Sept. 6, 1956
31 Claims. (Cl. 260—513)

This invention is concerned generally with a coupling reaction involving halogenated organic compounds and, in one particular but not exclusive aspect thereof, the invention is concerned with the use of this reaction as a route to unsaturated compounds, such as halogenated alkenes, potentially useful in polymerization and other reactions.

This application is a continuation-in-part of my copending application Serial No. 526,087, filed August 2, 1955, which is itself a continuation-in-part of my copending application Serial No. 377,716, filed August 31, 1953. Both of said applications are now abandoned.

By way of general introduction it may be stated that halogenated, particularly fluorinated, alkenes are becoming of increasing industrial importance. Thus, for example, the compound tetrafluoroethylene is of great value in synthetic organic fluorine chemistry and finds numerous industrial applications.

There are many other potentially valuable halogenoalkenes of which the classes of perfluorohalogenodienes and other fluorohalogenodienes may be cited as exemplary. In many cases industrial application of such halogenated dienes has been precluded or discouraged owing to the lack of commercially attractive methods of preparation. Thus for the 1,3-diene, hexafluorobutadiene, whose polymerization products are of potential importance, no really satisfactory method of preparation has hitherto been suggested.

It has now been found that certain primary halogenated compounds can be coupled by simple techniques to form longer chain compounds having various important uses, among which is included the production of halogenated dienes.

Specifically, the present invention provides methods of coupling compounds of the general formula $$RCXYZ$$

where Z is selected from the class consisting of chlorine, bromine and iodine, Y is a halogen atom of no greater atomic weight than Z, X is selected from the class consisting of hydrogen and halogen atoms having no greater atomic weight than Z and R is selected from the class consisting of alkyl, halogenoalkyl, alkenyl and halogenoalkenyl groups having from 1 to about 20 carbon atoms, cycloalkyl, halogenocycloalkyl, cycloalkenyl and halogenocycloalkenyl groups having up to about 6 carbon atoms, aryl and halogenaryl groups.

In one method according to the invention, the compound, or compounds, to be coupled are subjected to energization to raise the energy level of the compound or compounds sufficiently to cause fission of the C—Z bond and formation of the free radical RCXY·. This may be accomplished in any convenient way; for example by heat, ultra-violet, infra-red, X, $\gamma$, or high energy electron radiation, and the particular form of energization chosen will depend on the particular compound or compounds being reacted and on factors of convenience and practicability.

In accordance with this aspect of the invention, the reaction is preferably, but not necessarily, carried out in the presence of a halogen acceptor such as zinc, magnesium, tin, iron, cadmium, mercury and other metals; NaOH, KI, $Na_2S_2O_3$ and $R_aSNa$ where $R_a$ is an organic radical. In an especially convenient embodiment of the invention, the reaction is carried out using ultra-violet radiation in the presence of mercury.

The reaction conditions used will vary greatly depending upon the reactants and the particular method chosen. Thus for example, where ultra-violet or other radiation is employed with or without a halogen acceptor the reaction may be carried out at from say −30° C. to 350° C., usually from room temperature to say 200° C. Where heat alone is used without other energization and with or without a halogen acceptor, the minimum temperature required to effect fission is normally on the order of 20 to 450° C., usually between about 50 and about 280° C.

In the reactions according to the invention which are carried out by means of free radical mechanisms, i.e. by radiation or heat with or without a halogen acceptor, pressure is not an important factor and may range from say 0.1 mm. to superatmospheric, for example, to 500 atmospheres absolute. Normally pressures of 1 to 20 atmospheres are employed. Reaction time is again not critical and may be from 5 minutes to 5 weeks, depending on the temperature and pressure.

In certain cases it may be desirable to carry out the free radical reactions in the presence of a solvent. When used, the solvent chosen should be one which is inert to the reactant or reactants and to the product or products. Other characterisics may be prescribed by the particular reaction being carried out; for example, where ultraviolet radiation is employed the solvent should be substantially transparent to radiation in the range 250–350 m$\mu$. Often the reaction product is a suitable solvent. Examples of other useful solvents are perfluoromethylcyclohexane, $$CF_2ClCFCl_2,\quad CF_2ClCFClCFClCF_2Cl,$$
$$CF_3CF_2CF_2CF_2Cl,\quad (C_4F_9)_2O,\quad (C_3F_7)_3N$$

It will be understood, however, that where the coupling reaction is carried out by a free radical mechanism, the use of a solvent is not necessary and is simply a matter of convenience.

In an alternative process, according to the invention, the coupling may be carried out by bringing the compound, or compounds, to be coupled into contact with a dehalogenating metal, such for example, as zinc, magnesium, tin, iron, aluminum, copper or cadmium in the presence of a suitable solvent.

When the coupling is carried out by means of a dehalogenating metal, the metal attacks the C—Z bond in the compounds to be coupled, removing the Z atom and in this way performing the function of the ultra-violet or other energizing agency in the first method referred to above. The reaction conditions which favor intermolecular, rather than intramolecular dehalogenation are in general provided by a temperature between about −20° C. and about 300° C., usually between about 0° C. and about 150° C., the precise temperature depending on the boiling point of the solvent used and on the pressure. Generally speaking, moreover, higher temperatures within the stated range are used for intermolecular dechlorination than for debromination or deiodination. The pressure may range from sub-atmospheric, say 10 mm. Hg absolute to superatmospheric, say 100 atmospheres absolute. Normally it will be from about 100 mm. Hg to about 5 atmospheres absolute. The reaction time is not critical. To obtain a yield in excess of 60% it may range from 5 minutes to say 2 weeks, depending on temperature, pressure and the particular reactants.

Where a dehalogenating metal is to be used it is necessary to use a solvent. The solvent should be an organic compound preferably having a dielectric constant greater than 1.5. Preferably it will be a Lewis base, and preferably, though not necessarily, it will be free from acid hydrogens. Examples of suitable solvents are dioxan, benzene, acetic anhydride, and aliphatic mono- and polyhydric alcohols having more than 2, say from 3 to 10 carbon atoms such as propanol, glycerol, hexanol and decanol.

In the practice of the methods of the invention, it is preferred to effect the coupling reaction by intermolecular deiodination as opposed to debromination or dechlorination as the former is more readily achieved. Further, the substituents X and Y are preferably different, although X and Y may be the same; also it is preferred that X represent halogen as opposed to hydrogen. In general, it may be noted that the coupling of the compound RCXYZ to give RCXYCXYR occurs most easily when X and Y are iodine or bromine, less easily when X and Y are chlorine and least easily when X and Y are fluorine.

It may also be noted that the more halogen atoms in the R groups, the greater the ease with which the coupling reaction proceeds. Fluorine, chlorine and bromine substituents in the R group also promote the coupling reaction in increasing order.

With the above-stated considerations serving as a general guide, the optimum reaction conditions for the coupling of any given starting material will either be obvious or may be readily determined empirically.

As pointed out above the present invention deals with reactions between two compounds of the formula

RCXYZ or two molecules of the same compound having that formula. Particularly preferred starting materials are halogenated alkanes, halogenated cycloalkanes and halogenated alkenes and cycloalkenes, especially those in which R is a perfluoro group; thus in the above formulae R could be a $CF_3$, $-C_2F_5-$, $C_3F_7-$ group or other halogenated group preferably not having more than about 20 carbon atoms or a cyclic group such as $C_6F_{11}-$, $C_5F_9-$ or $C_6F_5-$.

The methods according to the present invention lead to the preparation of compounds having the general formula

RCXYCXYR it being understood that the two R's, the two X's and the two Y's in this formula may be the same or different depending on whether two molecules of the same compound or one molecule of each of two different compounds are reacted.

Certain of these compounds have never before been prepared and exhibit useful and valuable properties. Thus, for example, compounds of the type $R_bCFXCFXR_b$ where X is as defined above and $R_b$ is selected from the class consisting of halogenoalkyl and halogenoalkenyl groups having from 3 to about 10 carbon atoms, and containing fluorine and at least one other halogen atom selected from the group consisting of bromine and chlorine; halogenocycloalkyl and halogenocycloalkenyl groups of from 3 to 6 carbon atoms and containing fluorine and at least one other halogen atom selected from the group consisting of chlorine and bromine; and halogenoaryl groups containing fluorine and at least one other halogen selected from the group consisting of chlorine and bromine, are considered to be new.

Other valuable new compounds are those in which $R_b$ is perfluoroalkyl and perfluoroalkenyl of 3–10 carbon atoms; perfluorocycloalkyl and perfluorocycloalkenyl of 3–6 carbon atoms and perfluoroaryl.

The novel compounds as will be developed more specifically below provide intermediates for the preparation of unsaturated compounds which may be polymerized to provide heat resistant plastics and lubricants and are useful per se as plasticizers for fluorinated resins, insecticides and as lubricants or lubricant additives.

In many cases, especially where the starting materials are halogenoalkenes, alkenes, cycloalkanes and cycloalkenes, the products of the coupling reaction may serve as valuable intermediates in the preparation, by intramolecular dehalogenation and/or dehydrohalogenation, of more highly unsaturated compounds, for example, straight or branched chain halogenated polyenes, particularly perfluorodienes, other fluorodienes, perfluorochlorodienes and other fluorochlorodienes. This aspect of the invention is exemplified later in considerable detail by the production, inter alia of hexafluorobutadiene by the coupling of a hexalogenoethane to yield a decahalogenobutane, this latter compound being dehalogenated to the desired hexafluorobutadiene. The last compound may be polymerized to give oils which are stable to heat and chemical attack as well as plastic material having these properties.

In the production of straight and branched chain halogenated polyenes, particularly perfluorodienes, other fluorodienes, perfluorochlorodienes and other fluorochlorodienes, according to the invention, many methods may be employed in preparing the necessary starting materials. However, such starting materials may in many cases be most fruitfully derived from alkenes, halogenoalkenes, acetylenes and halogenoacetylenes by addition to these compounds of iodine monochloride or monobromide, the addition product being subjected to a coupling and subsequent dehalogenation and/or dehydrohalogenation reaction. Where the iodine halide addition reaction is selected for the preparation of starting materials, it should also be pointed out that the coupling reaction of the invention may occur to some extent in situ; this will be apparent from Example IV given hereinafter.

Considering first the application of the invention to the production of fluorodienes, this may be exemplified by the preparation of the 1,3-diene, hexafluorobutadiene.

The preparation of hexafluorobuta-1,3-diene in accordance with a preferred practice of the invention involves the coupling of either the compound $CF_2ClCFClI$ (Compound I) or $CF_2BrCFClI$ (Compound II) to yield respectively, by the removal of one molecule of iodine, $CF_2ClCFClCFClCF_2Cl$ (Compound III) or $CF_2BrCFClCFClCF_2Br$ (Compound IV). Compounds III or IV are then dehalogenated to yield the desired hexafluorobuta-1,3-diene.

The coupling step may be achieved, in this preferred operation, either by exposing Compounds I or II to the action of mercury and ultra-violet light or by treating a concentrated solution of such compounds in a solvent such as dioxan with a dehalogenating metal, e.g. zinc. Since the subsequent dehalogenation of the products of the coupling reaction may be effected in situ by treatment with zinc and a solvent such as dioxan at higher temperature, it is preferred to use this method for the coupling step also. In this manner the conversion of Compound I or II to hexafluorobuta-1,3-diene can be brought about in one vessel by raising the temperature after the formation of the coupled product. It may be mentioned that irradiation of Compound I with ultraviolet light in the presence of mercury under relatively mild conditions yields $CF_2ClCFClHgI$, photolysis of which in an inert solvent such as perfluoromethyl cyclohexane gives the desired Compound III above.

The starting materials, i.e. Compounds I and II, in the process above described may be conveniently prepared by the addition reaction of iodine monochloride or monobromide, as the case may be, with commercially available chlorotrifluoroethylene. It has been established that such reaction does in fact yield compounds of the structure indicated. The reaction takes place readily under slight pressure, e.g. in an autoclave in the absence of a solvent, or somewhat more slowly when the chlorotrifluoroethylene is passed through a suspension of the iodine halide in solvents such as carbon tetrachloride, 1,1,2-trichlorotrifluoroethane, 1,2-dibromo-1-chlorotrifluoroethane, or any fluoro- or fluorohalo-compounds of suitable boiling point. The use of Compound I or II as reaction media has also been found convenient, since the necessity for subsequent efficient frictional distillation is thereby removed. As might be expected, the addition of iodine chloride occurs at a much lower temperature than that of iodine bromide. The reaction should be carried out in the absence of oxygen and to this end an atmosphere of nitrogen may be employed.

The only by-product from the addition of the iodine halide to chlorotrifluoroethylene is the compound in which the iodine atom in Compound I or II has been replaced by chlorine or bromine respectively. This is ascribed to the reaction of chlorofluoroethylene with chlorine or bromine (formed by dissociation of the iodine halide into iodine and halogen), or to the secondary reaction of Compound I or II with the iodine halide or halogen. The by-products 1,1,2-trichlorotrifluoroethane and 1,2-dibromo-1-chlorotrifluoroethane are dehalogenated to chlorotrifluoroethylene in almost theoretical yield, so that the preparation of Compounds I and II may be essentially quantitative.

It should be noted that the addition of an iodine halide to an alkene or acetylene does not necessarily constitute the only or most preferred method available for the preparation of compounds to which the coupling procedure may be applied. Among other methods available for the preparation of the starting compounds RCXYZ are those set forth below:

(*a*) The addition of compounds of the type $R_cCXYZ$ to unsaturated linkages in acetylenic or alkene derivatives, $R_c$ representing an organic group which need not necessarily contain halogen. The addition of $R_cCXYZ$ to acetylenes or alkenes, including those containing halogen, may be effected by use of ultra-violet light or of a catalyst promoting free radical reactions (e.g. a peroxide), or by use of a catalyst promoting ionic reaction (e.g. a Friedel-Crafts type catalyst), or by any other means known to the art.

(*b*) The addition of hydrogen fluoride, chloride, bromide or iodide or of fluorine, chlorine, bromine or iodine to unsaturated linkages in acetylenic or olefinic derivatives.

(*c*) The halogenation by fluorine, bromine, chlorine or iodine of suitable compounds containing hydrogen.

(*d*) By metathesis reactions, e.g. by replacement of chlorine, bromine or iodine by fluorine.

(*e*) By dehydrohalogenation, dehalogenation, hydrogenation, dehydrogenation, decarboxylation, etc. of suitable compounds.

(*f*) By the process described and claimed in my copending applications Serial No. 526,086, filed August 2, 1955, and its continuation-in-part Serial No. 680,914, filed August 29, 1957. Reference may also be had to my U.K. patent applications Nos. 23,106/54 and 15,157/55 filed respectively August 9, 1954, and May 25, 1955. As described in the above applications polymers and adducts of the general formula $$n(CF_2X_1CClY_1)m(R_1)nZ_1$$

where $R_1$ may be fluoro alkene or fluoro polyene, $X_1$ is bromine or chlorine, $Y_1$ is chlorine or fluorine and $Z_1$ is bromine or iodine, where when $R_1$ is fluoro alkene, *n* is unity and *m* is an integer not greater than 20 where when $R_1$ is fluoro polyene, *n* is an integer not greater than 20 and *m* is an integer not greater than 30, can be made by reacting a fluoro alkene or a fluoro polyene with a perhalogeno ethane having the general formula $$CF_2X_1CClY_1Z_1$$

According to the copending application referred to, this reaction may be carried out under the influence of ultra-violet radiation, under heat with an initiator, under heat and ultra-violet radiation, under heat without either ultra-violet or an initiator, or under the action of a radioactive initiator. Certain of the compounds so made can be coupled by the process described in the present application provided that the compound as a whole conforms to the formula RCXYZ set forth above.

(*g*) By the technique described by Hauptschein et al., Journal American Chemical Society, 79, 2549 (May 20, 1957). Again it will be understood that only those compounds which conform to the formula RCXYZ given above may be employed.

(*h*) By the process described in Hauptschein et al. copending application Serial No. 663,005, filed June 3, 1957, now abandoned, and its continuation-in-part application Serial No. 773,551, filed November 13, 1958, now Patent No. 2,975,220 which describes polymers and adducts of various telogens with vinylidene fluoride, $CH_2=CF_2$.

The invention finds general application in the preparation of higher chain length halogenated compounds from those of lower chain length. Such compounds have many uses. Some may be useful as resin plasticizers, some may have biocidal (i.e. insecticidal, herbicidal, etc.) activity, and all are generally useful as intermediates.

The coupled products in accordance with the invention may be treated by normal dehalogenating or dehydrohalogenating procedures to give unsaturated compounds. Thus, for example, $$RCX'X''Z' + RCX'X''Z'$$

↓ coupling $$RCX'X''CX'X''R$$

↓ dehalogenation $$RCX'=CX'R$$

where R is as defined above, X' is selected from the group consisting of hydrogen, fluorine, chlorine, bromine, X'' is selected from the group consisting of bromine and chlorine and Z' is bromine or iodine.

If in either of the above compounds, RCX'X''Z', X' is hydrogen, dehydrohalogenation may be performed in place of dehalogenation, viz:

$$RCH'X''CX'X''R$$

↓ dehydrohalogenation $$RCX''=CX'R$$

One particularly useful application of the coupling procedure of the invention is the preparation of straight chain non-conjugated polyenes using a starting material of the type $R_dCXYZ'$ in which $R_d$ is a straight chain halogenoalkyl group having from 1 to about 20 carbon atoms. Depending on the chain length of the group $R_d$ and the disposition of halogen atoms therein, successive dehalogenation or dehydrohalogenation reactions may be applied to the coupled product $R_dCXYCXYR_d$ etc., to produce polyenes containing progressively more ethylenic linkages. This application may be illustrated as follows:

$$CF_2BrCFBr(CF_2)_nCFClI$$

↓ intermolecular deiodination $$CF_2BrCFBr(CF_2)_nCFClCFCl(CF_2)_nCFBrCF_2Br$$

↓ intramolecular debromination $$CF_2=CF(CF_2)_nCFClCFCl(CF_2)_nCF=CF_2$$

(Compound V)

The same reaction may be represented more generally as follows:

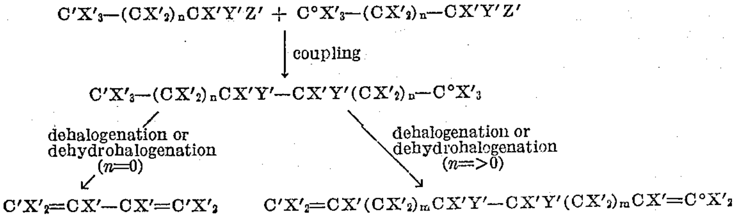

In the above equations, $n$ is from 0 to 20 and $m$ is $n-1$, Y′ is fluorine, chlorine or bromine, Z′ is bromine or iodine, and X′ is hydrogen, fluorine, chlorine or bromine, provided that at least one X′ substituent on the C′ and C° carbon atoms is hydrogen, chlorine or bromine and that at least one X′ substituent on the carbon atoms adjacent the C′ and C° carbon atoms is such as to be capable of forming with said one substituent on the C′ and C° carbon atoms a molecule of the class $Cl_2$, $Br_2$, HCl, and HBr.

If in Compound V above the integer $n$ is 0, a diene will result which may be further intramolecularly dechlorinated to give a triene, thus:

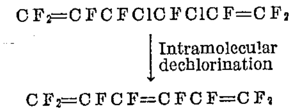

(Compound VI)

This reaction typifies a further aspect of the invention which may be represented more generally as follows:

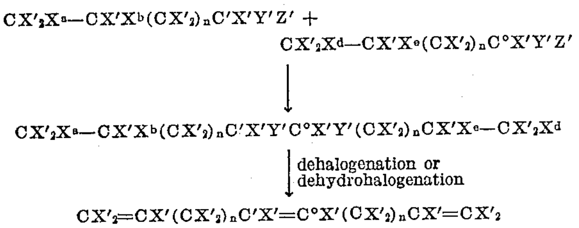

In the above equations $n$ is from 0 to 20 $X^a$, $X^b$, $X^e$ and $X^d$ are selected from the group consisting of hydrogen chlorine and bromine and not more than one of $X^a$ and $X^b$, and not more than one of $X^e$ and $X^d$ are hydrogen; X′ is from the group consisting of hydrogen, fluorine, chlorine, and bromine and Y′ is selected from the group consisting of fluorine, chlorine and bromine, provided that at least one of the X′ and Y′ substituents on each the C′ and C° carbon atoms is selected from the group consisting of hydrogen, bromine and chlorine, and that when the X′ substituent on said C′ carbon atom is hydrogen, said C° carbon atom has a substituent selected from the group consisting of chlorine and bromine.

Halogenated trienes of this type, i.e. trienes of the above formula where X′ is fluorine, chlorine or bromine, are new and exhibit properties which make them useful as intermediates—as will be explained in more detail below.

Whether a diene or triene is obtained will depend on the structure of the original compound and on the conditions of reaction. Those skilled in the art can easily determine the conditions necessary to obtain the desired degree of unsaturation for any particular compound.

In a further aspect of the invention branched chain dienes may be prepared from a starting material $R_eCXYZ'$ wherein as before Z′ is iodine or bromine (preferably iodine), X and Y are as appropriate bromine, chlorine, or fluorine (although X can as stated be hydrogen) and $R_e$ is a branched chain alkyl group or halogenated branched chain alkyl group. The coupling reaction is followed by intramolecular dehydrohalogenation and/or dehalogenation.

Branched chain dienes of particular interest which may be prepared in accordance with the process of the invention are represented by the general formula:

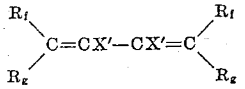

Formula 1 where X′ is as defined above and $R_f$ and $R_g$ are selected from the group consisting of alkyl, halogenoalkyl, alkenyl and halogenoalkyl groups having not more than about 17 carbon atoms, cycloalkyl and halogenocycloalkyl groups having up to about 6 carbon atoms, aryl and halogenoaryl groups. It will be understood that $R_f$ and $R_g$ may be the same or different and that each $R_f$ and each $R_g$ group may be the same as or different from the other $R_f$ or $R_g$ group. Compounds represented by the above formula are preferably perfluorodienes, other fluorodienes, perfluorochlorodienes and other fluorochlorodienes.

The general reaction for the production of such branched chain dienes may be represented as:

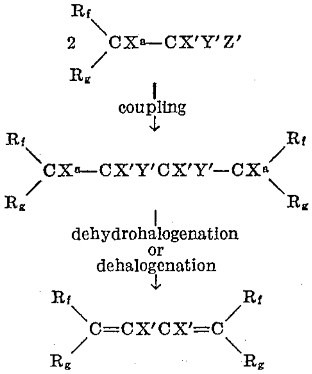

X′ in the above equation benig hydrogen, fluorine, chlorine or bromine, $X^a$ being hydrogen, chlorine or bromine, Y′ being bromine, chlorine or fluorine and Z′, as above, bromine or iodine, but in no case of less atomic weight than any other halogen in the compound to be coupled.

This type of reaction is exemplified below:

(1)

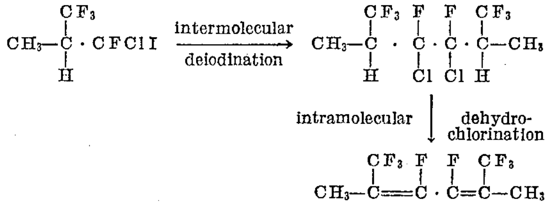

A branched chain compound may also be coupled with a straight chain compound, as for example:

(2)

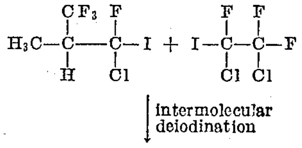

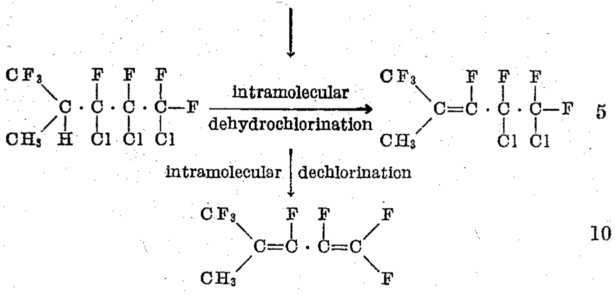

A more general representation of Reaction 2 above may be given as

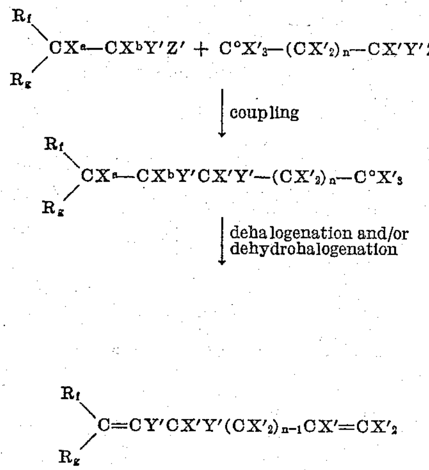

In the above equations, Y′ is fluorine, chlorine or bromine, Z′ is bromine or iodine, $n$ is from 0 to 20, $R_f$ and $R_g$ are as defined above, $X^a$ and $X^b$ are hydrogen, chlorine or bromine, and X′ is hydrogen, fluorine, chlorine, or bromine, provided that no more than one of $X^a$ and $X^b$ is hydrogen and provided further that at least one of the X′ atoms on said C° carbon atom is hydrogen, chlorine or bromine and that the carbon atom adjacent to the C° carbon atom has at least 1 atom subtended therefrom which is capable of forming with said one X′ atom on the C° carbon atoms, a molecule of the group HCl, HBr, $Cl_2$ and $Br_2$.

The intramolecular dehalogenation or dehydrohalogenation reactions discussed above may be carried out using any conventional technique. Dehalogenation is normally accomplished by bringing the compound into reactive association with a halogen acceptor, for example, zinc dust, iron, magnesium or sodium amalgam. The reaction is preferably carried out in the presence of a solvent for the organic compounds involved. Examples of suitable solvents are alcohols such as methanol, ethanol, butanol, tetrahydropyran and tetrahydrofuran, glycols such as ethylene glycol; ethers and substituted amides.

The temperature at which the reaction occurs is normally the reflux temperature of the particular solvent used. Dehalogenation reactions may, however, be carried out at room temperature or below and in general the reaction temperature may range from 0 to say 200° C., normally between about 100° C. and about 120° C. Pressure is not critical and may range from say 200 mm. Hg absolute to 50 atmospheres. Normally, however, it will be from about 1 to about 20 atmospheres. Reaction time is again not critical. It may range from say 20 minutes to a week and is usually on the order of ½ to 10 hours.

It will be observed that the conditions just given for intramolecular dehalogenation overlap those previously given for intermolecular dehalogenation. It will be understood that in some coupling reactions using a dehalogenating metal, intramolecular dehalogenation will occur as a side reaction. When the nature of the initial compound to be coupled, RCXYZ, is such that internal dehalogenation is favored to the extent that the yield of coupled product is unacceptably small, the other coupling process, i.e. energization to produce free radicals, is used.

Dehydrohalogenation reactions may be carried out by conventional procedures using alcoholic KOH or NaOH. In such reactions the temperature is normally between about −20° C. and about 160° C. Pressure is not critical and may be from say 0.1 to 15 atmospheres absolute. The reaction time may vary from about 15 minutes to about 48 hours.

If, in Formula 1 given above, one or more of the groups $R_f$ or $R_g$ is an alkene group or halogenated (preferably fluorinated and/or chlorinated) alkene group, then of course, the compounds represented will be polyenes having more than two ethylenic linkages in the molecule. Such polyenes are also important products of the present invention.

Polyenes of a somewhat different type can also be made by a coupling reaction according to the invention, where each of the two compounds coupled has more than one unsaturated linkage. Such compounds include those having the general formula

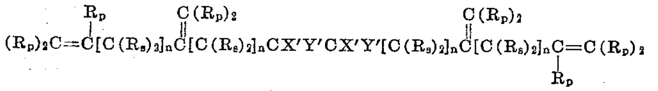

where $R_p$ is selected from the group consisting of hydrogen, fluorine, chlorine, bromine, alkyl, halogenoalkyl, alkenyl and halogenoalkenyl groups having from 1 to 20 carbon atoms, cycloalkyl, halogenocycloalkyl, cycloalkenyl and halogenocycloalkenyl having from 3 to 6 carbon atoms; aryl and halogenoaryl, where $R_s$ is selected from the group consisting of hydrogen, fluorine, chlorine, bromine, alkyl and halogenoalkyl of say one to four carbon atoms, where X′ is hydrogen, fluorine, chlorine, or bromine and where Y′ is fluorine, chlorine, or bromine.

Still another group of useful compounds can be prepared according to the present invention from certain specific types of the polymeric materials whose preparation and properties are described in my copending application Serial No. 526,086 referred to above, and its continuation-in-part application Serial No. 680,914, filed August 29, 1957, now abandoned.

As pointed out above, the compounds described in said copending application include polymers and adducts of the general formula $$CF_2X''CClY''(R_n)_nZ$$

where X″ is chlorine or bromine, Y″ is chlorine or fluorine, Z is as described above, $R_n$ is fluoroalkene and $n$ is from 1 to about 20.

Of this general class, however, only certain types of compounds are suitable for the coupling reactions described herein. In general, it may be said that the compound must conform to the structure RCXYZ set forth earlier in this application. Thus, the polymers and adducts subjected to coupling are those in which the fluoroalkene is such that its terminal carbon atom, i.e. the carbon atom joined to the Z atom, has one halogen substituent of no greater atomic weight than the Z atom and another substituent which is either halogen of no greater atomic weight than Z or hydrogen, it being also necessary that the starting molecule contain no other halogen substituents, particularly the halogen substituent X″ in the above formula, which are more reactive than the Z halogen. For convenience, such polymers or adducts may be represented as:

$$CF_2X''CClY''(R_j)_rZ$$

where X″, Y″ and Z are as defined above, $R_j$ is a fluoro alkene radical having the qualifications as to halogen content given above and $r$ is an integer not greater than 20. Examples of $-(R_j)_r-$ groups in the above formula are the following: $-(CF_2CFCl)_r-$, $-(CF_2CF_2)_r-$, $-(CFCCl_2)_r-$, $-(CF_2CHCl)_r-$, $-(CH_2CHF)_r-$, $-(CH_2CF_2)_r-$ and $-(CGFCF_2)_r-$.

Referring first to coupling reactions involving these polymers and adducts, the general reaction may be written $$CF_2X''CClY''(R_j)_pZ' + CF_2QCClU(R_m)_qZ$$

$$\downarrow$$

$$CF_2''CClY''(R_j)_p(R_m)_qCClUCF_2Q$$

where Z and Z′ are selected from the group consisting of bromine and iodine; X″ and Q are selected from the group consisting of bromine and chlorine; Y″ and U are selected from the group consisting of fluorine and chlorine; $R_j$ and $R_m$ represent fluoroalkene radicals having the qualifications as to halogen content given above; $p$ and $q$ are integers not greater than 20. It will be understood that the two compounds entering into the reaction may be the same or different.

Illustrative of such coupling reactions is the following:

$$Cl(CF_2CFCl)_{p+1}I + I(CFClCF_2)_{q+1}Cl \rightarrow Cl(CF_2CFCl)_{p+1}(CFClCF_2)_{q+1}Cl$$

The coupled compounds so made may be subjected to dehalogenation to give a diene, such reaction being shown below $$CF_2X''CClY''(R_j)_p(R_m)_qCClUCF^2Q$$

$$\downarrow \text{intramolecular dehalogenation}$$

$$CF_2{=}CY''(R_j)_p(R_m)_qCU{=}CF_2$$

It is to be understood that the chain $-(R_j)_p(R_m)_q-$ must be less susceptible to dehalogenation than the $CF_2X''CClY''-$ and $CF_2QCClU-$ groups under the conditions used for intramolecular dehalogenation. Typical groups from which $R_j$ and $R_m$ may be chosen are $-CF_2CFCl-$, $-CF_2CF_2-$, $-CH_2-CF_2-$, and $-CH_2CFCl-$.

If the $-(R_j)_p-$ and $-(R_m)_q-$ groups are such that their terminal carbon atoms, i.e. the carbon atoms next to the Z′ and Z″ atoms in the formulae $$CF_2X''CClY''(R_j)_pZ'$$

and $$CF_2QCClU(R_m)_qZ''$$

each have a halogen other than fluorine attached thereto, the triene can also be made by dehalogenation, thus $$CF_2{=}CF''(R_j)_{p-1}R_n{-}CX'X''CX'X''{-}R_o(R_m)_{q-1}CU{=}CF_2$$

$$\downarrow \text{intramolecular dehalogenation}$$

$$CF_2{=}CF''(R_j)_{p-1}R_n{-}\overset{X'}{C}{=}\overset{X'}{C}{-}R_o(R_m)_{q-1}CU{=}CF_2$$

where $R_n$ is $R_j$, less its terminal carbon atom and $R_o$ is $R_m$, less its terminal carbon atom, and X′ and X″ are as defined above.

The dehalogenation reactions disclosed generally above are illustrated by the following specific reaction:

$$Cl(CF_2CFCl)_{p+1}(CFClCF_2)_{q+1}Cl$$

$$\downarrow \text{dechlorination}$$

$$CF_2{=}CF(CF_2CFCl)_p(CFClCF_2)_qCF{=}CF_2$$

$$\downarrow \text{dechlorination}$$

$$CF_2{=}CF(CF_2CFCl)_{p-1}CF_2CF{=}CFCF_2(CFClCF_2)_{q-1}CF{=}CF_2$$

In carrying out the dehalogenation reactions, the conventional techniques disclosed above are employed.

Whether a diene or a triene is obtained will depend on the structure of the original polymer and on the conditions of reaction. Those skilled in the art may easily determine the reaction conditions necessary to obtain the desired unsaturated compound for any particular polymer.

The above-described terminally unsaturated compounds may be oxidized, e.g. with aqueous $KMnO_4$, to form dicarboxylic acids.

The general reaction may be written as $$CF_2{=}CY''(R_j)_p(R_m)_qCU{=}CF_2$$

$$\downarrow \text{oxidation}$$

$$HOOC(R_j)_p(R_m)_qCOOH$$

it being understood that the chain $-(R_j)_p(R_m)_q-$ is less susceptible to oxidation than the end groups $CF_2{=}CY''$ and $CF_2{=}CU-$. Suitable values for $R_j$ and $R_m$ will include $-CF_2CFCl-$, $-CF_2CF_2-$ and $-CH_2CF_2-$.

Illustrative of this type of reaction is the following specific reaction:

$$CF_2{=}CF(CF_2CFCl)_p(CFClCF_2)_qCF{=}CF_2$$

$$\downarrow \text{oxidation with aqueous } KMnO_4$$

$$HOOC(CF_2CFCl)_p(CFClCF_2)_qCOOH$$

Further, it has been found possible to produce perfluorodicarboxylic acids by oxidation of a terminally unsaturated perfluoro triene; this reaction may be utilized as described in detail later for the preparation of the new compound perfluoromalonic acid.

In another type of oxidation reaction, a terminally unsaturated triene disclosed above may be split to give two di-basic acids. This reaction is feasible when X′ in the appropriate formula given above is chlorine or fluorine and may be written as follows:

$$CF_2{=}CY''(R_j)_{p-1}R_n{-}\overset{Y''}{C}{=}\overset{U}{C}{-}R_o(R_m)_{q-1}CU{=}CF_2 \longrightarrow HOOC{-}(R_j)_{p-1}R_n{-}COOH + HOOC{-}R_o(R_m)_{q-1}{-}COOH$$

This may be illustrated by the oxidation of particular trienes whose preparation is described above. Thus:

$$CF_2{=}CF(CF_2CFCl)_{p-1}CF_2CFCF_2(CFClCF_2)_{q-1}CF{=}CF_2$$

$$\downarrow \text{oxidation } (KMnO_4)$$

$$HOOC(CF_2CFCl)_{p-1}CF_2COOH + HOOCCF_2(CFClCF_2)_{q-2}COOH$$

In carrying out the oxidation reactions described above, no special technique is required. Various conventional oxidizing agents such as alkali metal permanganates, e.g. potassium permanganates, alkali metal dichromates, e.g. potassium dichromate or ozone may be used but potassium permanganate is the preferred agent using the technique described by Haszeldine in "Journal of the Chemical Society" 4259 (1952).

The reaction is preferably carried out at a slightly elevated temperature, for example, at 30–60° C. or up to 200° C., but may be carried out at room temperature or even below room temperature, to say 0° C. Pressure is not critical and may be atmospheric or up to say 50 atmospheres. Reaction time is whatever is required to complete the particular oxidation being carried out. It is usually on the order of one to several hours but may be up to 5 days.

The dicarboxylic acids whose preparation has been described above may be converted to their corresponding silver salts and these salts may then be subjected to reaction with halogen whereby they undergo decarboxylation with simultaneous halogenation to give substantial yields of a halogeno alkane. Although this reaction is known for the silver salts of perfluoro acids it was surprising to find it proceeds also with the silver salts of polyfluorochloro acids, since the latter exhibit properties markedly different from the corresponding perfluoro compounds.

This novel reaction may be written $$AgOOC(R_p)(R_q)COOAg \xrightarrow{Z_2} Z(R_p)(R_q)Z$$

where $R_p$ and $R_q$ are polyfluorochloroalkyl groups having from 2 to say 40 carbon atoms and Z is as defined above.

This reaction is normally carried out under anhydrous conditions at a temperature that may range from about −30° C. to about 250° C., depending on the halogen used. Subatmospheric pressure is employed, ranging from 0.01 to say 500 mm. Hg absolute. Proportions are not critical and may range from 0.1 to 10 moles of halogen per mole of salt. Preferably, however, an excess of halogen is employed. The reaction time is normally from about ½ to about 24 hours.

It should be noted that the decarboxylation also proceeds with unsaturated polyfluorochloro dicarboxylic acids although in this case where the halogen Z is bromine or chlorine some halogen addition may take place to the unsaturated group or groups in the starting compound.

The polyfluorochloro dicarboxylic acids may also be converted to the corresponding alkali metal salts which on subjection to pyrolysis yield dienes having two less carbon atoms than their precursors. The pyrolysis reaction which applies also to polyfluorobromo dicarboxylic acids, may be illustrated by the important new general and specific reactions given below:

$$MOOCCF_2CFX''R_sR_tCFX''CF_2COOM \xrightarrow{\text{Heat}} CF_2{=}CFR_sR_tCF{=}CF_2 + 2MX'' + 2CO_2$$

where M is an alkali metal such as sodium or potassium, and $R_s$ and $R_t$ are polyfluoro groups or polyfluorochloro groups, for example, polyfluoroalkyl or polyfluorochloroalkyl groups having up to say 40 carbon atoms. The cases where $R_s$ and $R_t$ are perfluoro or perfluorochloroalkyl groups of 1 to 10 carbon atoms are of particular interest.

As an example of a specific reaction the following may be given:

$$MOOCCF_2CFCl(CF_2CFCl)_p(CFClCF_2)_qCFClCF_2COOM \longrightarrow CF_2{=}CF(CF_2CFCl)_p(CFClCF_2)_qCF{=}CF_2$$

The starting material for this reaction may be made by the coupling reaction referred to above and the products of the pyrolysis are terminally unsaturated dienes of a chain length which may be adjusted at will. This reaction is also of interest in that the dienes produced thereby may be subjected to dehalogenation to give a triene by removing chlorine from adjacent carbon atoms in the middle of the chain, such carbon atoms being in fact the terminal carbon atoms of the two molecules coupled together to form the starting material of the reaction; thus it is possible to produce the corresponding trienes of the formula $$CF_2{=}CF(CF_2CFCl)_{p-1}CF_2CF{=}CFCF_2(CFClCF_2)_{q-1}CF{=}CF_2$$

In the general pyrolysis reaction given above, a noteworthy point (when Z=Cl), is the elimination of a $\beta$ chlorine atom which results in a chloride by-product such as sodium chloride as opposed to a fluoride by-product which is produced when perfluorocarboxylic acids are pyrolyzed and which must then be recovered on economy grounds; sodium chloride being cheap may be simply discarded as a waste product.

The pyrolysis is preferably performed under anhydrous conditions at temperatures of from about 50° C. to about 350° C. The pressure is usually atmospheric or less, preferably between about 1 and about 350 mm. Hg absolute.

Instead of converting the terminally unsaturated coupled adducts and polymers described earlier into carboxylic acids and derivatives of such acids, they may also be converted into surface active sulphonic acids and sulphonates, for example, by reaction of the terminally unsaturated compounds with an alkali metal bisulphite, particularly sodium bisulphite, followed by treatment with sulphuric acid if the free acid is desired.

This reaction may be written $$CF_2{=}CY''(R_j)_p(R_m)_qCU{=}CF_2 + 2MHSO_3 \longrightarrow MSO_3CF_2CHY''(R_j)_p(R_m)_qCHUCF_2SO_3M$$

where M is an alkali metal, $R_j$, $R_m$, Y'' and U are as defined above and *p* and *q* are integers not greater than 20.

This reaction is preferably carried out in an aqueous medium in the presence of a peroxide initiator. As examples of suitable initiators there may be cited benzoyl peroxide, acetyl peroxide, hexachloroacetyl peroxide, hexafluoroacetyl peroxide, di-tertiarybutyl-acetyl peroxide, $\alpha,\alpha'$-azo-diisobutyronitrile and di-azomethane. The initiator is preferably used in a concentration of say 1–10% on the weight of the unsaturated compound. The reaction temperature may be from about 20° C. to about 300° C., preferably from about 50° C. to about 200° C. Pressure is not critical and may range from say 100 mm. absolute to on the order of 200 atmospheres. Preferably pressures of from atmospheric to about 30 atmospheres are used. The reaction time depends on the other conditions. Normally it is on the order of one to 48 hours.

It has further been found that a specific group of compounds of the general class $$CF_2X'CClY''(R_j)_nZ$$

namely those having the formula $$CF_2X''CClY''(R_xR_yC{-}CY'X'')_nZ'$$

where Y' is chlorine, bromine, or fluorine, where X'' is bromine or chlorine, where Z' is bromine or iodine, where $R_x$ and $R_y$ are hydrogen, halogen, alkyl, or halogenoalkyl having up to about 10 carbon atoms, and *n* is not greater than about 20, can be reacted with molecular oxygen to give compounds of the general type $$CF_2X''CClY''(R_xR_yC{-}CX''Y')_{n-1}R_xR_yC{-}COOH$$

and that along with these carboxylic acids there may be formed coupled compounds of the general formula $$CF_2X''CClY''(R_xR_yC{-}CX''Y')_n(CX''Y'{-}CR_xR_y)_nCClY''CF_2X''$$

This oxidation may be carried out using oxygen and ultraviolet light with or without heat, oxygen with heat and an initiator such as one of the peroxide initiators listed above or with heat and oxygen alone. When ultraviolet light is used, the reaction temperature will usually range from room temperature (20° C.) to about 200° C., preferably from 20° C. to about 100° C. When heat alone is used to initiate free radical formation higher temperatures will be necessary, e.g. between about 50° C. and about 350° C., preferably between about 100° C. and about 250° C.

Pressure is not critical and may be from say 10 mm. Hg absolute to 50 atmospheres, usually from 0.5 to 15 atmospheres. The reaction time may vary from ½ hour to say one week, normally from about 5 hours to about three days. Normally between about 0.1 and about 10 moles of oxygen ($O_2$) will be present per mole of fluoro compound.

Such reactions carried out in the presence of molecular oxygen are thus another method of performing the coupling described above.

More generally stated, a third method of coupling is provided in which compounds of the type $$R_w(R_xR_yC{-}CX''Y')_nZ'$$

may be reacted with one another in the presence of molecular oxygen to give products of the type $$R_w(R_xR_yC—CX''Y')_n(CX''Y'—CR_xR_y)_nR_w$$

where $R_w$ is perfluoro-, perfluorochloroalkyl or perfluorobromoalkyl of say 1 to 20 carbon atoms, perfluorocycloalkyl, perfluorochlorocycloalkyl or perfluorobromocycloalkyl of say 3 to 6 carbon atoms, perfluoroaryl, perfluorochloroaryl or perfluorobromoaryl. X'' is chlorine or bromine, Y' is fluorine, chlorine or bromine, Z' is bromine or iodine, $R_x$ and $R_y$ are hydrogen, halogen, alkyl or halogenoalkyl of 1–10 carbon atoms and $n$ is from 1 to say 20. The oxidation reactions are described more fully in my said copending application Serial No. 526,086, filed August 2, 1955, and its continuation-in-part application Serial No. 680,914, filed August 29, 1957.

In addition to the telomers and adducts listed above which may be made according to my copending application, the process of the present invention is applicable in general to compounds of the type described in the Hauptschein et al. article referred to above and in Hauptschein et al. Patent No. 2,975,220. The Hauptschein et al. article describes the formation of telomers and adducts of difficultly telomerizable olefins and diolefins. Such telomers and adducts may be employed in the present process, provided they conform to formula RCXYZ given above.

Hauptschein et al. Patent No. 2,975,220 deals with certain adducts and telomers of vinylidene fluoride, such for example as $$C_3F_7(CH_2CF_2)_nZ$$

where Z is as defined above and $n$ is from 1 to 20. These compounds may be coupled in accordance with the present invention and the products so obtained include, as brought out in the above application, valuable lubricants showing exceptionally good temperature-viscosity characteristics. In general therefore the invention includes as new compositions of matter, products of the formula $$R_f(R_j)_p(R_m)_qR'_f$$

where $R_j$ and $R_m$ are as defined above and $R_f$ and $R'_f$ are selected from the group consisting of fluoroalkyl, fluorochloroalkyl, fluoroalkenyl and fluorochloroalkenyl radicals of 1–20 carbon atoms, fluorocycloalkyl, fluorochlorocycloalkyl, fluoroalkenyl and fluorochlorocycloalkenyl groups of 3–6 carbon atoms and fluoro and fluorochloroaryl groups. The fluorobromo compounds in each of these categories are also of value. Of particular interest, however, are the perfluoro and perfluorochloro groups. For practical purposes these compounds and indeed all the compounds discussed in this application will have not more than around 50 carbon atoms in the molecule. Higher chain lengths can be made, but since the uncoupled products are usually solids to begin with the coupling reaction is difficult to carry out and the products are generally not as useful as those having 50 or less carbon atoms in the molecule.

In addition to the above noted examples of compounds that may be coupled in accordance with my invention, a number of other exemplary compounds of the type RCXYZ are listed below:

$CF_2ClCFClCF_2CCl_2Br$
$C_6H_5CCl_2I$
$C_2H_5CClBrI$
$CF_3CF_2CFClBr$
$CF_3CF_2CFBr_2$
$C_6F_{11}CHClI$
$C_5F_9CCl_2Br$
$C_4F_7CHClI$
$CF_3(CF_2)_nI$
$CF_3CFClCHBrI$

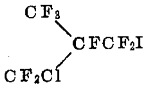

$CCl_2{=}CFCHBrI$

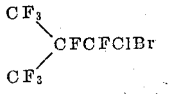

By way of illustration, the following examples are given which show the practice of the invention as applied to the preparation of various halogenated dienes. All parts are by weight.

*Example I*

ADDITION OF IODINE MONOCHLORIDE TO CHLOROTRIFLUOROETHYLENE

Chlorotrifluoroethylene was condensed into an evacuated steel bomb fitted with needle valve and pressure gauge, and containing an equivalent amount of iodine monochloride. The bomb was sealed and warmed to 35–40° C. to melt the iodine monochloride. An exothermic reaction set in on shaking, and the pressure reached a maximum of 9 atmospheres before dropping rapidly to atmospheric pressure. The initialed reaction was complete after ten minutes and, after standing for two hours, the contents of the bomb were removed by pumping through a trap cooled in liquid air. All the chlorotrifluoroethylene had been converted into a liquid product which, after treatment with sodium thiosulphate to remove traces of iodine, was dried (phosphoric anhydride) and distilled to give 1,1,2-trichlorotrifluoroethane (1% yield), B.P. 47.5–48.0° C., $n_D^{25}$ 1.355, and 1,2-dichloro-1,2,2-trifluoroiodoethane (97%). (Found: C, 8.7; M, 275,280, $C_2Cl_2F_3I$ requires C, 8.6%; M, 279), B.P. 99–99.5° C., $n_D^{20}$ 1.4449, a colorless liquid turning pink on exposure to light. Ultraviolet absorption spectrum in ethanol; λ max. 261 mμ, ε295; λ min. 233 mμ, ε190. (ε=molar extinction coefficient.)

In another preparation, the bomb containing iodine monochloride was evacuated, heated to 30° C. and connected by a flexible metal pressure tube to a cylinder of chlorotrifluoroethylene. The olefin was slowly admitted to the continuously shaken bomb at such a rate that the temperature did not rise above 40° C., until no more was absorbed (2 hrs.). The excess chlorotrifluoroethylene was removed, and the contents of the bomb were distilled to give 1,2-dichloro-1,2,2-trifluoroiodoethane (96%). A small amount of iodine was left in the bomb.

In reaction at atmospheric pressure, chlorotrifluoroethylene was passed by means of a dispersion disc into a stirred suspension of iodine monochloride in previously prepared 1,2-dichloro-1,2,2-trifluoroiodoethane warmed to 45–50° C. The unchanged olefin was recycled, and after a total of four hours no further absorption occurred. After removal of iodine with sodium thiosulfate, the yield of distilled 1,2-dichloro-1,2,2-trifluoroiodoethane was 87%, and of 1,1,2-trichlorotrifluoroethane was 6%.

The 1,1,2-trichlorotrifluoroethane formed as a by-product in the above experiment was reconverted to chlorotrifluoroethylene in 95% yield by treatment with zinc and ethanol.

THE COUPLING OF THE 1,2-DICHLORO-1,2,2-TRIFLUOROIODOETHANE 1,2-dichloro-1,2,2-trifluoroiodoethane and about an equal volume of mercury were sealed in an evacuated silica tube which was then shaken horizontally by means of a vibro-shaker. Intimate mixing of the mercury and iodo-compound was thereby obtained, and upon exposure to ultraviolet light from a Hanovia arc situated 5 cm. from the reaction vessel, mercuric iodide was rapidly deposited. Use of an excess of mercury prevents coating of the walls of the vessel by mercuric iodide. After 48 hours the liquid contents of the tube were transferred by heating and pumping to a cooled trap, then distilled to give unchanged 1,2 - dichloro - 1,2,2 - trifluoroiodoethane (5%), B.P. 99–100° C., 1,2,3,4-tetrachlorohexafluorobutane (82% yield based on iodo-compound taken), found: C, 15.6; Cl, 46.4; $C_4Cl_4F_6$ requires C, 15.8; Cl, 46.7%), B.P. 134.0–134.5° C., 75° C./106 mm., $n_D^{23}$ 1.382, and an unidentified by-product (ca. 7%); B.P. ca. 95° C./30 mm., $n_D^{23}$ 1.394.

A similar experiment, carried out in a silica tube which was rocked gently during reaction, gave an 85% yield of 1,2,3,4-tetrachlorohexafluorobutane (89% yield based on the iodo-compound used) (95%) after 48 hours.

The experiment was repeated with the tube stationary during irradiation. The mercury/organic liquid interface became covered with mercuric iodide and after 48 hours, examination of the liquid reaction products showed them to consist of 1,2,3,4-tetrachlorohexafluorobutane (71% yield) and unchanged 1,2-dichloro-1,2,2-trifluoroiodoethane (5%). The ethereal extract of the solid products yielded, after removal of the ether and sublimation of the residual solid, 1,2-dichloro-1,2,2-trifluoroethyl mercuric iodide (12% yield). (Found: C, 5.2; I, 26.0; $C_2Cl_2F_3IHg$ requires C, 5.0; I, 26.5%), white plates recrystallized from chloroform to M.P. 92–94° C. and with an odor similar to that of trifluoromethyl mercuric iodide. On exposure to ultraviolet light while suspended in perfluoromethylcyclohexane, the mercurial was converted into mercuric iodide and 1,2,3,4-tetrachlorohexafluorobutane (61% yield).

PREPARATION OF HEXAFLUOROBUTA-1,3-DIENE

To a well stirred suspension of zinc dust in ethanol (about 50% zinc) heated under reflux in a vessel fitted with an efficient water condenser leading to traps cooled in liquid air, was added dropwise over five hours 1,2,3,4-tetrachlorohexafluorobutane in ethanol in the proportion of 30 parts of the halobutane to 100 parts zinc. Steady gas evolution took place, and after a further two hours the contents of the liquid air traps were passed through 5% sodium hydroxide and distilled in vacuo to give hexafluorobuta-1,3-diene (98%). (Found: C, 29.5; M, 162; calc. for $C_4F_6$; C, 29.6%; M, 162), B.P. 5.8° C.

*Example II*

COUPLING OF 1,2-DICHLORO-1,2,2-TRIFLUOROIODOETHANE AND CONVERSION INTO HEXAFLUOROBUTA-1,3-DIENE IN ONE VESSEL

To a vigorously stirred suspension of zinc and dioxan at 25–30° C., was slowly added 25% of a solution of 1,2-dichloro-1,2,2-trifluoroiodoethane in dioxan. After a further 20 mins., the temperature was slowly raised to 50° C. (or to 100° C. to produce hexafluorobutadiene), and after cooling to 25° C. again, a second 25% of the iodo-compound solution was slowly added. This cycle of operations was repeated until complete addition of the chlorofluoroiodide had been achieved. Altogether 17 parts of iodo-compound were added to 30 parts zinc. The volatile products at this state were chlorotrifluoroethylene (40%) and a trace of hexafluorobuta-1,3-diene. Care must be taken with the intermolecular deiodination carried out in this way. If the temperature is too low, or the solution of iodo-compound too dilute, little deiodination occurs initially and when the temperature is raised a very vigorous reaction sets in which leads almost completely to chlorotrifluoroethylene formation. If the temperature is too high, intramolecular dehalogenation occurs to the exclusion of intermolecular deiodination. The intramolecular dehalogenation is favored in ethanolic solution and the use of dioxan, benzene or a higher alcohol is advantageous.

The 1,2,3,4-tetrachlorohexafluorobutane formed by the intermolecular deiodination is converted into hexafluorobuta-1,3-diene by raising the temperature of the dioxan solution to give a reflux. The total yield of hexafluorobuta-1,3-diene, separated from chlorotrifluoroethylene in a vacuum system is 60%.

*Example III*

ADDITION OF IODINE BROMIDE AND CHLOROTRIFLUOROETHYLENE

Chlorotrifluoroethylene (11.65 parts) and iodine monobromide (23 parts) in a steel bomb were heated from 30° to 100° C. over a period of 2 hours. Preliminary experiments had shown that there was incomplete reaction at 60° C. for a similar period, but that reaction was essentially complete at 80° C. for 6 hours. Distillation of the contents of the bomb gave unchanged chlorotrifluoroethylene (2%), 1,2-dibromo-1-chlorotrifluoroethane (4% yield). (Found: C, 8.6; calc. for $Br_2ClF_3$; C, 8.7), B.P. 92–92.5° C., $n_D^{25}$ 1.425 and 1-bromo-2-chloro-1,1,2-trifluoroiodoethane (84% yield). (Found: C, 7.5; $C_2BrClF_3I$ requires C, 7.4%), B.P. 82° C./195 mm., $n_D^{25}$ 1.482. The last compound is partly decomposed by distillation at atmospheric pressure but can be distilled in the dark under partial vacuum as a colorless liquid which readily liberates iodine on exposure to light.

THE CONVERSION OF 1-BROMO-2-CHLORO-1,1,2-TRIFLUOROIODOETHANE INTO HEXAFLUOROBUTA-1,3-DIENE

Mercury (130 parts) and 1-bromo-2-chloro-1,1,2-trifluoroiodoethane (16.2 parts) were sealed in a silica tube which was shaken vigorously and exposed to ultra-violet radiation for 3 days. The liquid products were separated from mercuric iodide by heating and pumping into a trap cooled in liquid air, and were then distilled to give 1,4-dibromo-2,3-dichlorohexafluorobutane (14.9 parts; 75%). (Found: C, 12.3; $C_4Br_2Cl_2F_6$ requires C, 12.2%), B.P. 75° C./20 mm., $n_D^{20}$ 1.427, and traces of unchanged 1-bromo-2-chloro-1,1,2-trifluoroiodoethane (<1%).

The 1,4-dibromo-2,3-dichlorohexafluorobutane (7.9 parts) dissolved in ethanol (10 parts) was added as fast as possible to zinc powder (20 parts) in boiling ethanol (50 parts); after 6 hours the volatile products were washed with water and fractionated in vacuo to give hexafluorobuta-1,3-diene (3.05 parts; 92%), B.P. 5.5–6.0° C., whose identity was confirmed by its infra-red spectrum.

*Example IV*

PREPARATION OF $CF_2ClCCl_2I$ AND $CF_2BrCCl_2I$ 1,1-dichlorodifluoroethylene (12.1 parts) was condensed in an evacuated steel bomb containing iodine monochloride (20 parts). The bomb was sealed and warmed to 40° C., at which temperature it was maintained for 2 hours. The temperature was slowly raised to 90° C., then reduced to 20° C. The reaction products were distilled to give:

(1) Unchanged $CF_2{=}CCl_2$—10% yield.
(2) $CF_2ClCCl_3$, B.P. 91° C.—15% yield.
(3) $CF_2ClCCl_2I$ (1,1,2-trichloro-2,2-difluoroiodoethane), B.P. 77° C./100 mm. ca. 133° C./760 mm.—63% yield. (Found: C, 8.2, $C_2Cl_3F_2I$ requires, C, 8.1%.)
(4) $CF_2ClCCl_2CCl_2CF_2Cl$ (1,2,2,3,3,4-hexachlorotetrafluorobutane), B.P. 143° C./110 mm.—10% yield. (Found: C, 13.9, $C_4Cl_6F_4$ requires C, 14.2%.)

Addition of iodine monobromide to 1,1-dichlorodifluoroethylene similarly gave 1-bromo-2,2-dichloro-1,1-difluoroiodoethane ($CF_2BrCCl_2I$), B.P. 80° C./50 mm. (Found: C, 7.1, $C_2BrCl_2F_2I$ requires C, 7.05%), as well as 1,2-dibromo-1,1-dichlorodifluoroethane $$(CF_2BrCCl_2Br)$$

M.P. 46° C., B.P. 139–140° C., and 1,4-dibromo-2,2,3,3-tetrachlorotetrafluorobutane ($CF_2BrCCl_2CCl_2CF_2Br$), B.P. 80–85° C./ca. 2 mm.

It will be noted from the above experimental results and from some of those given hereinafter that some coupling occurs during the addition reaction of the iodine halide with the olefin, in this case the compound $CF_2{=}CCl_2$.

COUPLING OF $CF_2ClCCl_2I$ AND OF $CF_2BrCCl_2I$

On exposure to ultra-violet light at 20° C. for 48 hours, $CF_2ClCCl_2I$ (10 parts) and mercury, vigorously shaken together, gave mercuric iodide and $CF_2ClCCl_2CCl_2CF_2Cl$ identical with that obtained above. The yield was 87%.

Coupling of $CF_2BrCCl_2I$ similarly gave $CF_2BrCCl_2CCl_2CF_2Br$ identical with that obtained above, in 64% yield.

DEHALOGENATION OF $CF_2ClCCl_2CCl_2CF_2Cl$

The compound $CF_2ClCCl_2CCl_2CF_2Cl$ (10.1 parts) dissolved in ethanol (20 parts) was added to zinc dust (50 parts) in ethanol (100 parts) heated in an apparatus with reflux condenser maintained at 80° C. so that ethanol and material of B.P. >80° C. slowly distilled through the condenser and was collected in water (400 parts). After addition of all the $CF_2ClCCl_2CCl_2CF_2Cl$, the temperature of the reaction flask was raised until only ethanol was passing through the reflux condenser. The product collected as a lower layer in the water and was washed with a further quantity of water, dried over $P_2O_5$ and distilled to give in 83% yield, 2,3-dichlorotetrafluorobuta-1,3-diene ($CF_2{=}CClCCl{=}CF_2$), B.P. 65° C. (Found: C, 24.8; M, 195. $C_4Cl_2F_4$ requires C, 24.6%; M, 195.)

1,1,2-trichloro-2,2-difluoroiodoethane can be converted into 2,3-dichlorotetrafluorobuta-1,3-diene in situ by application of the procedure of Example II, with the modification that between the portionwise addition of the solution of $CF_2ClCCl_2I$, and also finally, the temperature is raised to cause the dichlorotetrafluorodiene to distill through a reflux condenser maintained at 80° C. for collection under water to remove traces of dioxan. $CF_2ClCCl_2I$ (15 parts) was thus converted into $CF_2{=}CClCCl{=}CF_2$ in 58% yield. The main by-product was $CF_2{=}CCl_2$ (32%).

On reaction with chlorine, the $CF_2{=}CClCCl{=}CF_2$ absorbed 2 moles to give $CF_2ClCCl_2CCl_2CF_2Cl$ identical with the material described earlier.

*Example V*

PREPARATION OF $CFCl_2CCl_2I$ 9.7 parts of 1,1,2-trichlorofluoroethylene were treated with iodine monochloride (90% of theory for addition) by the procedure outlined for $CF_2{=}CCl_2$ in the preceding example. The products were:

(1) $CFCl_2CCl_2I$ (1,1,2-tetrachloro-1-fluoroiodoethane), B.P. 100–103° C./ca. 100 mm. 40% yield. (Found: I, 40.0. $C_2Cl_4FI$ requires I, 40.7%.)
(2) $CFCl_2CCl_3$, B.P. 139–140° C., a solid—33% yield.
(3) $CFCl_2CCl_2CCl_2CFCl_2$ (1,4 - difluorooctachlorobutane), B.P. 150°C./18 mm., 100° C./ca. 2 mm., 21% yield. (Found: Cl, 75.7. $C_4Cl_8F_2$ requires Cl, 76.8%.)

COUPLING OF $CFCl_2CCl_2I$

Treatment of 5 parts of $CFCl_2CCl_2I$ dissolved in $CF_2ClCFCl_2$ (1,1,2-trichlorotrifluoroethane) solution with mercury and ultra-violet light as described for $CF_2ClCCl_2I$ in Example IV gave, after 12 hours, an 82% yield of $CFCl_2CCl_2CCl_2CFCl_2$ (1,4-difluorooctachlorobutane).

DEHALOGENATION OF $CFCl_2CCl_2CCl_2CFCl_2$ 5.3 parts of $CFCl_2CCl_2CCl_2CFCl_2$ were dissolved in ethanol (10 parts) and added in four batches to zinc (20 parts) and ethanol (30 parts). The temperature was slowly raised to 80–90° C. for 1 hour between each batch, then cooled to 20° C. before addition of the next batch. The ethanolic solution was filtered, an excess of water was added, and the lower layer dried over $P_2O_5$ and distilled to give in 71% yield $CFCl{=}CClCCl{=}CFCl$ (1,2,3,4-tetrachlorodifluorobuta-1,3-diene), B.P. 80–82° C./100 mm., 142° C./760 mm. (Found: C, 20.6. $C_4Cl_4F_2$ requires C, 21.0%.)

Addition of 2 moles of chlorine to the diene gave $CFCl_2CCl_2CCl_2CFCl_2$ identical with the starting material for the dehalogenation step.

*Example VI*

PREPARATION OF $CFCl_2CFClI$

The addition of iodine monochloride (10% excess) to 1,2-dichlorodifluoroethylene (11.3 parts) was effected as described for $CF_2{=}CCl_2$ in Example IV, and gave 74% of 1,1,2-trichloro-1,2-difluoroiodoethane, $CFCl_2CFClI$, B.P. 80–81° C./100 mm. (Found: I, 42.7. $C_2Cl_3F_2I$ requires I, 43.0%.)

COUPLING OF $CFCl_2CFClI$ 7.1 parts of $CFCl_2CFClI$ were dissolved in $CF_2ClCFCl_2$ (5 parts), vigorously shaken with mercury while exposed to ultra-violet light, and gave $CFCl_2CFClCFClCFCl_2$ (1,1,2,3,4,4-hexachlorotetrafluorobutane) in 78% yield. B.P. 136° C./102 mm., 123° C./73 mm. (Found: Cl, 63.4. $C_4Cl_6F_4$ requires Cl, 63.2%.)

DEHALOGENATION OF $CFCl_2CFClCFClCFCl_2$

Treatment of 6.8 parts of $CFCl_2CFClCFClCFCl_2$ with zinc and ethanol as described for the dehalogenation of $CF_2ClCCl_2CCl_2CF_2Cl$ in Example IV gave $CFCl{=}CFCF{=}CFCl$ (1,4-dichlorotetrafluorobuta-1,3-diene), B.P. 75–76° C. in 78% yield. (Found: Cl, 36.4; M, 195. $C_4Cl_2F_4$ requires Cl, 36.4%; M, 195.)

The diene absorbed chlorine (2 moles) to give the same hexachlorotetrafluorobutane as was used for the dehalogenation step.

The coupling of $CFCl_2CFClI$ to give $(CFCl_2CFCl)_2$ followed by dechlorination was effected in one process by reaction of the iodo-compound with zinc and dioxan or benzene, as described above for $CF_2ClCFClI$ modified as described for $CF_2ClCCl_2I$ in Example IV. The yield of the diene was 49%.

*Example VII*

COUPLING OF $CF_2ClCCl_2I$ WITH $CFCl_2CCl_2I$

Equimolar amounts of $CF_2ClCCl_2I$ and $CFCl_2CCl_2I$ (total 10.1 parts) were dissolved in $CF_2ClCFCl_2$ (5 parts) and vigorously shaken with mercury in a silica tube for 58 hours while exposed to ultra-violet radiation. The resulting solution was decanted from the mercuric iodide formed, which was washed with $CF_2ClCFCl_2$ (2 parts), and the combined solutions were distilled to give:

(1) $CF_2ClCFCl_2$—solvent
(2) $CF_2ClCCl_2CCl_2CF_2Cl$—26% yield (cf. Example IV)
(3) $CFCl_2CCl_2CCl_2CFCl_2$—28% yield (cf. Example V)
(4) $CF_2ClCCl_2CCl_2CFCl_2$—42% yield, B.P. 110–113° C./15 mm.

(Found: Cl, 70.1. $C_4Cl_7F_3$ requires Cl, 70.3%.)

DEHALOGENATION OF $CF_2ClCCl_2CCl_2CFCl_2$

Treatment of the compound (5.3 parts) with zinc and ethanol as described for the dehalogenation of $CFCl_2CCl_2CCl_2CFCl_2$ in Example V gave 1,2,3-trichlorotrifluorobuta-1,3-diene ($CF_2{=}CClCCl{=}CFCl$), B.P. 104.5–105.5° C. in 61% yield. (Found: Cl, 49.9; M, 210. $C_4Cl_3F_3$ requires Cl, 50.4; M, 211.5.)

*Example VIII*

COUPLING OF $CF_2ClCCl_2I$ WITH $CF_2ClCFClI$

Equimolar amounts (9.3 parts total) of $CF_2ClCCl_2I$ and $CF_2ClCFClI$ were dissolved in $CF_2ClCFCl_2$ (5 parts) and treated as for the coupling of $CF_2ClCCl_2I$ and $CFCl_2CCl_2I$ described in the preceding example. Distillation gave:

(1) $CF_2ClCFCl_2$—solvent (2) $CF_2ClCCl_2CCl_2CF_2Cl$—53% yield (cf. Example IV)
(3) $CF_2ClCFClCFClCF_2Cl$—43% yield (cf. Example I)
(4) 1,2,2,3,4-pentachloropentafluorobutane ($CF_2ClCFClCCl_2CF_2Cl$)

41% yield, B.P. 150–153° C./500 mm., ca. 173° C./760 mm. (Found: Cl, 55.1. $C_4Cl_5F_5$ requires Cl, 55.4%.)

DEHALOGENATION OF $CF_2ClCFClCCl_2CF_2Cl$ $CF_2ClCFClCCl_2CF_2Cl$ (4.7 parts) was dehalogenated by slowly adding its solution in ethanol (5 parts) to zinc (15 parts) and ethanol (20 parts) heated in an apparatus whose reflux condenser was maintained at 60° C. to permit the removal of the 2-chloropentafluorobuta-1,3-diene ($CF_2{=}CFCCl{=}CF_2$) which was collected under water and redistilled from $P_2O_5$ in a vacuum system. B.P. ca. 38° C. Yield 80%. (Found: Cl, 19.6; M, 179. $C_4ClF_5$ requires Cl, 19.9%; M. 178.5.)

*Example IX*

COUPLING OF $CFCl_2CCl_2I$ WITH $CF_2ClCFClI$

Equimolar amounts of $CFCl_2CCl_2I$ and $CF_2ClCFClI$ (7.7 parts total) dissolved in $CF_2ClCFCl_2$ (5 parts) and treated as described for the coupling of $CF_2ClCCl_2I$ and $CFCl_2CCl_2I$ in Example VII, gave on distillation:

(1) Solvent
(2) $CFCl_2CCl_2CCl_2CFCl_2$—41% yield (cf. Example V)
(3) $CF_2ClCFClCFClCF_2Cl$—39% yield (cf. Example I)
(4) 1,1,2,2,3,4-hexachlorotetrafluorobutane ($CF_2ClCFClCCl_2CFCl_2$)

B.P. 120° C./79 mm., 51% yield. (Found: Cl 63.3. $C_4Cl_6F_4$ requires Cl, 63.2%.)

DEHALOGENATION OF $CF_2ClCFClCCl_2CFCl_2$

Dehalogenation of 4 parts of $CF_2ClCFClCCl_2CFCl_2$ was effected in 53% yield by the procedure given for $CF_2ClCCl_2CCl_2CF_2Cl$ in Example IV, to give 1,2-dichlorotetrafluorobuta-1,3-diene ($CF_2{=}CFCCl{=}CFCl$), B.P. ca. 68° C. (micro). (Found: Cl, 35.9; M, 195. $C_4Cl_2F_4$ requires Cl, 36.4; M, 195).

*Example X*

COUPLING OF $CF_2ClCFClI$ WITH $CFCl_2CFClI$ 8.3 parts of an equimolar mixture of $CF_2ClCFClI$ and $CFCl_2CFClI$ were dissolved in $CF_2ClCFCl_2$ (5 parts) and treated as for the coupling of $CF_2ClCFClI$ and $CFCl_2CCl_2I$ described in the preceding example. Distillation gave:

(1) Solvent
(2) $CF_2ClCFClCFClCF_2Cl$—41% yield (cf. Example I)
(3) $CFCl_2CFClCFClCFCl_2$—43% yield (cf. Example VI)
(4) 1,1,2,3,4-pentachloropentafluorobutane ($CF_2ClCFClCFClCFCl_2$)

47% yield, B.P. 140–146° C./400 mm., 175° C./760 mm. (micro). (Found: Cl, 55.3; $C_4Cl_5F_5$ requires Cl, 55.4%.)

DEHALOGENATION OF $CF_2ClCFClCFClCFCl_2$ 4.9 parts of $CF_2ClCFClCFClCFCl_2$ were dehalogenated as described for $CF_2ClCFClCCl_2CF_2Cl$ in Example VIII to give 1-chloropentafluorobuta-1,3-diene ($CF_2{=}CFCF{=}CFCl$)

in 78% yield. B.P. ca. 40° C. (micro). (Found: Cl, 19.9; M, 180. $C_4ClF_5$ requires Cl, 19.9; M, 178.5.)

*Example XI*

PREPARATION OF $CF_2ClCHClI$ 500 parts of iodine monochloride and 300 parts of $CF_2{=}CHCl$ were charged to a stainless steel cylinder which was shaken for 8 hours while being cooled. After the 8 hour period, the contents were discharged, washed with 500 parts of a 15% sodium thiosulfate solution, dried and distilled to yield 680 parts of 1,2-dichloro-1,1-difluoroiodoethane, $CF_2ClCHClI$, B.P. 126° C.

COUPLING OF $CF_2ClCHClI$ TO FORM $CF_2ClCHClCHClCF_2Cl$

Into a glass tube having a 15 watt germicidal fluorescent light mounted therein was charged 800 parts of $CF_2ClCHClI$ and 3,090 parts of mercury. The glass tube was evacuated and then shaken, while being irradiated, for a period of 48 hours. The organic material was then separated from the mercury compounds by vacuum distillation and fractionated to produce a 50% yield of 1,2,3,4-tetrachloro-1,1,4,4-tetrafluorobutane, $CF_2ClCHClCHClCF_2Cl$

B.P. 146–8° C.

DEHALOGENATION OF $CF_2CHClCHClCF_2Cl$ 464 parts of $CF_2CHClCHClCF_2Cl$ were added dropwise to 190 parts of zinc dust suspended in 240 parts of ethanol during the course of 3 hours while the ethanol was refluxed vigorously by heating. The addition was interrupted when about half completed and 50 parts of additional zinc dust were added. The product was obtained as a gas by this treatment and was passed through an efficient condenser, in the jacket of which water was circulating at a temperature of 35° C., thence through a tower packed with granular calcium chloride, and was condensed in a trap cooled in a salt-ice freezing mixture. 105 parts of 1,1,4,4-tetrafluorobuta-1,3-diene, $CF_2{=}CHCH{=}CF_2$ were obtained and 120 parts of organic material were recovered from the ethanol by dilution with water.

*Example XII*

PREPARATION OF $CF_3(CH_3)C{=}CFCF{=}CF_2$ AND $(CF_3)_2C{=}CFCF{=}CF_2$

The compound $CF_3(CH_3)CHCFClI$ (1-chloro-1-fluoro-1-diodo-2-trifluoromethylpropane) coupled with $CF_2ClCFClI$ by the photochemical method (Hg and ultra-violet light) or by the preferential intermolecular deiodination method (zinc and dioxan), gave $CF_3(CH_3)CHCFClCFClCF_2Cl$ (1,2,3-trichloro-1,1,2,3 - tetrafluoro - 4 - trifluoromethylpentane). Treatment of the last compound with a conventional dehydrohalogenating agent, namely alcoholic potassium hydroxide, in turn gave $CF_3(CH_3)C{=}CFCFClCF_2Cl$ (4,5-dichloro-3,4,5,5-tetrafluoro-2 - trifluoromethylpent-2-ene) and this compound with a dehalogenating agent, namely zinc and ethanol, yielded the desired diene $CF_3(CH_3)C{=}CFCF{=}CF_2$ (1,1,2,3-tetrafluoro-4 - trifluoromethyl penta - 1,3 - diene). (Found: C, 34.1; M, 208, $C_6H_3F_7$ requires C, 34.6%; M, 208.)

$(CF_3)_2CHCFClI$ similarly yields $(CF_3)_2C{=}CFCF{=}CF_2$ (1,1,2,3,5,5,5 - heptafluoro - 4 - trifluoromethylpenta-1,3-diene) by coupling followed by dechlorination.

The starting compounds $(CF_3)(CH_3)CHCFClI$ and $(CF_3)_2CHCFClI$ employed above may be prepared, for example, by the interaction of $CH_3CH{=}CFCl$ or $CF_3CH{=}CFCl$ and trifluoroiodomethane under conditions favoring a free radical reaction.

*Example XIII*

COUPLING OF IODO COMPOUNDS $Cl(CF_2CFCl)_nI$ (*a*) The compound $Cl(CF_2CFCl)_2I$, 5.1 parts, prepared as described in my copending application, Serial No. 526,086, filed August 2, 1955, was mixed with 7.8 parts of a $CF_2ClCFCl_2$ diluent and sealed in a silica tube with 135 parts of mercury and shaken vigorously while exposed to ultra-violet light for a period of 8 days. The organic material was extracted from the mercury iodides using ether and distillation of the extract produced the compound $Cl(CF_2CFCl)_2(CFClCF_2)_2Cl$ in a yield of 81%, B.P. 142–144°/20 mm., Hg absolute. (Found: C, 17.9; Cl, 39.7. Required: C, 19.7; Cl, 39.7), $n_D^{22}$ 1.408.

(*b*) 4.9 parts of the compound $Cl(CF_2CFCl)_3I$, prepared as described in my co-pending application, Serial No. 526,086, filed August 2, 1955, and treated as in (*a*) above, produced the compound $Cl(CF_2CFCl)_3(CFClCF_2)_3Cl$ in a yield of 74%, B.P. 195–200°/ca. $10^{-1}$ mm., Hg absolute. (Found: C, 18.7; Cl, 36.8. Required: C, 18.7; Cl, 36.9.)

DECHLORINATION OF $Cl(CF_2CFCl)_n(CFClCF_2)_nCl$ POLYMERS (*a*) 6.7 parts of $Cl(CF_2CFCl)_2(CFClCF_2)_2Cl$ were diluted with 16 parts of ethanol and added dropwise to a mixture of zinc and refluxing ethanol. After a period of one hour the contents of the reaction flask were filtered and added to an excess of water. The lower layer was distilled from $P_2O_5$ to produce the compound $CF_2{=}CFCF_2CF{=}CFCF_2CF{=}CF_2$ in a yield of 78%, B.P. 99–100° C. (Found: C, 29.8; H, 0; F, 70.0; M, 325. Required: C, 29.6; H, 0; F, 70.4; M, 324), and an unidentified fraction of higher boiling point. The triene was reconverted into the parent chloro-compound by a photochemical reaction by a 100% excess of chlorine, showing that cyclization had not occurred, and that the triene was not contaminated by hydrogen containing compounds.

(*b*) The reaction in (*a*) above was repeated at a temperature of 50–55° C. during a period of 10 hours. Only a trace of the triene was formed and a different product, $CF_2{=}CFCF_2CFClCFClCF_2CF{=}CF_2$ was obtained in a 51% yield, some of the parent hexachloro-compound remaining unchanged. The product had a boiling point of 58° C./20 mm., Hg absolute. (Found: C, 24.2; H, 0; Cl, 17.7. Required: C, 24.3; H, 0; Cl, 18.0.)

(*c*) 8 parts of the compound $Cl(CF_2CFCl)_3(CFClCF_2)_3Cl$ were treated as in (*a*) above to produce the compound $CF_2{=}CFCF_2CFClCF_2CF{=}CFCF_2CFClCF_2CF{=}CF_2$ in a yield of 65%, B.P. 115–120° C./20 mm., Hg absolute. (Found: C, 25.6; H, 0; Cl, 12.6. Required: C, 25.8; H, 0; Cl, 12.8.) This triene absorbed 3 moles of chlorine when treated with an axcess thereof and exposed to ultra-violet light for a period of one day.

(*d*) Mild treatment of the compound $Cl(CF_2CFCl)_3(CFClCF_2)_3Cl$ with zinc and ethanol as in (*b*) above produced the compound $CF_2{=}CFCF_2CFClCF_2CFClCFClCF_2CFClCF_2CF{=}CF_2$ in a yield of 56%, B.P. 150–152° C./0.1 mm., Hg absolute. (Found: C, 22.8; H, 0; Cl, 22.2. Required: C, 232.9; H, 0; Cl, 22.6.)

*Example XIV*

OXIDATION OF $CF_2{=}CFCF_2CF{=}CFCF_2CF{=}CF_2$

The triene $CF_2{=}CFCF_2CF{=}CFCF_2CF{=}CF_2$ was prepared by the reaction of $CF_2ClCFClI$ with chlorotrifluoroethylene to give $CF_2ClCFClCF_2CFClI$. This last compound was then shaken with mercury and exposed to ultra-violet light to give the coupled product $[CF_2ClCFClCF_2CFCl]_2$ which on treatment with zinc and ethanol gave the desired triene.

5.7 parts of the triene thus prepared were oxidized, employing potassium permanganate in the presence of sodium bicarbonate as the oxidizing agent, following the general procedure described by Haszeldine in J.C.S. (1952), the reaction mixture being heated at a temperature of 35° C. for 1 hour and then at a temperature of 60° C. for 1 hour. The product was worked up with $SO_2$, sulphuric acid and ether extraction and an ethereal solution of perfluoromalonic acid, $CF_2(CO_2H)_2$ was obtained. Evaporation of the ethereal solution gave $CF_2(CO_2H)_2$. (Found: C, 25.7%; equiv., 70. Required: C, 25.7%; equiv. 70), as a solid which after distillation at $10^{-3}$ mm. and recrystallization from benzene had a melting point of 118° C. (Yield, 63%.) Henne and Dewitt (JACS 70, 1548, 1948), reported that difluoromalonic acid was readily decarboxylated to difluoroacetic acid and failed to isolate the free acid. Under the conditions just described, decarboxylation does not occur and the acid is quite stable. It can, in fact, be heated to 160° C. without decarboxylation. Treatment of an ethereal solution of perfluoromalonic acid with diazomethane according to the procedure described by Henne and Dewitt gave the compound $CF_2(CO_2CH_3)_2$ (81% yield) having a boiling point of 60 to 62° C./12 mm. Hg absolute. (Found: C, 35.6%; H, 3.5%. Required: C, 35.7% H, 3.6%.) No methyl difluoroacetate was formed. For final identification of the compound, an ethereal solution of the dimethyl ester was converted into the amide $CF_2(CONH_2)_2$ having a melting point of 207° C. Found: C, 26.0%; H, 2.8%; N, 20.3%. Required: C, 26.1%; H, 2.9%; N, 20.3%.) The infra-red spectrum of this amide was identical with that of the amide prepared by an alternative route.

*Example XV*

OXIDATION OF $CF_2{=}CFCF_2CFClCFClCF_2CF{=}CF_2$ 6.7 parts of the diene $CF_2{=}CFCF_2CFClCFClCF_2CF{=}CF_2$ (prepared as described in Example XIII) were oxidized, using potassium permanganate as the oxidizing agent, as described in Example XIV above, to produce a 51% yield of the compound $HO_2CCF_2CFClCFClCF_2CO_2H$, which was obtained as a waxy solid upon evaporation of the ethereal solution. The compound was analyzed without further purification. (Found: C, 22.6%; H, 0.6%; Cl, 22.2%; equiv., 161.5. Required: C, 22.3%; H, 0.6%; Cl, 22.0%; equiv., 162.5.)

0.8 part of the dicarboxylic acid was then converted into the dimethylester $CH_3O_2CCF_2CFClCFClCF_2CO_2CH_3$ by treatment with diazomethane. The dimethylester had a boiling point of 155 to 158° C./2 to 4 mm. Hg absolute. (Found: C, 27.4%; H, 1.6%; Cl, 20.0%. Required: C, 27.4%; H, 1.7%; Cl, 20.2%.)

The remainder of the dicarboxylic acid was divided equally one portion being converted into the silver salt and the other into the sodium salt, each of which was thoroughly dried.

One gram of the disilver salt of the dicarboxylic acid was converted into the compound $CF_2ClCFClCFClCF_2Cl$ by reaction thereof with a stoichiometric excess of chlorine at a temperature of 120° C. in a sealed tube. The yield was 69%. Treatment of this product with zinc and refluxing ethanol converted the chloro compound into hexafluorobutadiene.

2.1 parts of the disodium salt of the dicarboxylic acid (found: Na, 12.5%. Required: Na, 12.7%), were powdered and pyrolysed in vacuo in a platinum tube at initial temperature of 150° C., which rose to 420° C. at the end of the pyrolysis. The products, condensed by liquid oxygen, were washed with a solution of sodium hydroxide having a concentration of 5% by weight and distilled in vacuo to provide a 71% yield of hexafluorobutadiene, which was identified by means of its infra-red spectrum.

*Example XVI*

COUPLING $C_4F_9CF(CF_3)[CH_2CH_2]_nI$

The compound $C_4F_9CF(CF_3)[CH_2CF_2]_{3.5\ av.}I$ was prepared as described in Patent No. 2,975,220 of Hauptschein and Braid.

Eight milliliters of mercury, 12.5 g. (0.019 mole) of $C_4F_9CF(CF_3)[CH_2CF_2]_{3.5\ av.}I$, and 10 ml. of 1,1,2-trichlorotrifluoroethane in a Vycor tube were shaken and exposed to ultraviolet irradiation for five days. The coupled product $(C_4F_9CF(CF_3)[CH_2CF_2]_{3.5\ av.})_2$, was an oil, B.P., 170°–230° C. at ca. 0.1 mm.; viscosities: 318 cs. at 78.4° F., 58.7 cs. at 123.8° F., 10 cs. at 197.8° F.; ASTM slope (78°–198° F.), 0.87. The conversion and yield were 83%.

By the same procedure, 14 g. (0.018 mole) of $$C_4F_9CF(CF_3)[CH_2CF_2]_{5.5\ av.}I$$

and 8 ml. of mercury, in 10 ml. of 1,1,2-trichlorotrifluoroethane were shaken and exposed to ultraviolet light for five days. The coupled product $$(C_4F_9CF(CF_3)[CH_2CF_2]_{5.5\ av.})_2$$

B.P. 180–260° C. at ca. 0.4 mm., was an oil, partially solid at 25° C., viscosities; 520 cs. at 100° F. (extrapolated), 204 cs. at 123.8° F., 26.5 cs. at 197.8° F., 21.8 cs. at 210° F. (extrapolated); ASTM slope (124°–198° F.), 0.77. The conversion and yield were 85%.

*Example XVII*

COUPLING $CF_3CF(CF_2Cl)[CH_2CF_2]_nI$

The compound $CF_3CF(CF_2Cl)[CH_2CF_2]_{3.9\ av.}I$ was prepared as described in Patent No. 2,975,220 referred to above.

Twenty grams (0.036 mole) of $$(CF_3CF(CF_2Cl)[CH_2CF_2]_{3.9\ av.}I$$

8 ml. of mercury, and 10 ml. of 1,1,2-trichlorotrifluoroethane were shaken in a Vycor tube under ultraviolet light for 4 days. The coupling product, $$(CF_3CF(CF_2Cl)[CH_2CF_2]_{3.9\ av.})_2$$

B.P. 153–240° C. at ca. 0.1 mm., was a heavy oil; viscosities: 455 cs. at 78.4° F., 181 cs. at 100° F. (extrapolated), 86.4 cs. at 123.8° F., 14.6 cs. at 197.8° F., 11.95 cs. at 210° F. (extrapolated); ASTM slope (78–198° F.), 0.79. The yield and conversion were 83%.

Twenty two grams (0.035 mole) of $$CF_3CF(CF_2Cl)[CH_2CF_2]_{4.9\ av.}I$$

8 ml. of mercury, and 10 ml. of 1,1,2-trichlorotrifluoroethane in a Vycor tube were exposed to ultravoilet irradiation while shaking for 6 days. The main fraction of coupled product, $$(CF_3CF(CF_2Cl)[CH_2CF_2]_{4.9\ av.})_2$$

B.P., 153–210° C. at <0.1 mm. was a heavy oil partially solid at 25° C., viscosities: 249 cs. at 123.8° F., 610 cs. at 100° F. (extrapolated), 34.6 cs. at 197.8° F., 28 cs. at 210° F. (extrapolated); ASTM slope (124–198° F.), 0.71. The yield and conversion were 70%.

*Example XVIII*

COUPLING OF $CF_3[CH_2CF_2]_nI$

Sixteen grams (0.062 mole) of $CF_3CH_2CF_2I$ and 8 ml. of clean dry mercury were sealed under a dry nitrogen atmosphere in a 50 ml. Vycor tube. After shaking for several days under ultraviolet irradiation, the tube was opened; 1,1,2-trichlorotrifluoroethane was added, and the reaction mixture was filtered to remove mercury and solids. Several additional portions of solvent were used to wash the residue on the filter, and all the filtrates were combined. After removal of the solvent by distillation, the coupled product, $CF_3CH_2CF_2CF_2CH_2CF_3$, was obtained as a colorless oil, B.P. 83° at 760 mm.

*Analysis.*—Calcd. for $C_6H_4F_{10}$: C, 27.1; H, 1.5; F, 71.4. Found: C, 27.2; H, 1.97; F, 71.0. The yield and conversion were 49%.

By the above procedure, 18 g. (0.056 mole) of $CF_3[CH_2CF_2]_2I$ and 8 ml. of mercury were shaken and irradiated with ultraviolet light for two days. The tube was opened, and, after the addition of 10 ml. of 1,1,2-trichlorotrifluoroethane, resealed and irradiated with shaking for several additional days. The coupled product, $(CF_3[CH_2CF_2]_2)_2$, a white solid, M.P. 38–40°, was isolated by distillation, B.P., 100° at 25 mm.

*Analysis.*—Calcd. for $C_{10}H_8F_{14}$: C, 30.5; H, 2.1; F, 67.5. Found: C, 30.5; H, 2.4; F, 67.2. The yield and conversion were 54%.

Similarly, thirteen grams (0.034 mole) of $$CF_3(CH_2CF_2)_3I$$

and 6 ml. of mercury were irradiated for two days. The tube was opened, 10 ml. of 1,1,2-trichlorotrifluoroethane were added, and tube was resealed and returned to the shaker for several additional days. The coupling product, $(CF_3[CH_2CF_2]_3)_2$, isolated by sublimation was a white solid, M.P. 40–44°.

*Analysis.*—Calcd. for $C_{14}H_{12}F_{18}$: C, 32.2; H, 2.3; F, 65.5. Found: C, 31.9; H, 2.4; F, 65.3. The yield and conversion based on the product isolated were 29%; however, in this case as well as in the two previous runs, efforts to separate all the product were not made. The actual conversions are estimated to be of the order of 80%.

*Example XIX*

COUPLING OF $CF_2ClCFCl[CH_2CF_2]_nI$

By use of the procedure described in Example XVIII 10 g. (0.024 mole) of $CF_2ClCFCl[CH_2CF_2]_{2.2\ av.}I$ were converted to the coupling product, $$(CF_2ClCFCl[CH_2CF_2]_{2.2\ av.})_2$$

an oil, B.P. 105–165° at ca. 0.1 mm., viscosity 15.3 cs. at 123.8° F., in 61% conversion and yield after shaking in a Vycor tube with 9 ml. of mercury and 10 ml. of 1,1,2-trichlorotrifluoroethane under ultraviolet irradiation for 4 days.

Similarly, 10 g. (0.019 mole) of $$CF_2ClCFCl[CH_2CF_2]_{4\ av.}I$$

9 ml. of mercury and 10 ml. of 1,1,2-trichlorotrifluoroethane were shaken in a Vycor tube for 4 days while exposed to ultraviolet light. The coupling product, $$(CF_2ClCFCl[CH_2CF_2]_{4\ av.}I)_2$$

was isolated as the fraction boiling mainly at 215–225° at ca. 0.1 mm., solid at room temperature. The yield and conversion were 54%.

*Example XX*

COUPLING OF $CF_3CF_2CF_2I$ 1-iodoperfluoropropane (29.6 g., 0.1 mole) and 10 ml. of mercury were sealed in a Vycor 7900 tube under a dry nitrogen atmosphere and shaken end to end for 9 days while exposed to ultraviolet irradiation. The entire product was finally converted to a brown solid mass. 1,1,2-trichloro-1,2,2-trifluoroethane was then added to the opened tube, which was resealed and irradiated for an additional 3 days when the solids were completely black. The cooled tube was then opened, the volatile contents were transferred in vacuo to a Vigreux unit and distilled. There were collected 33 g. of distillate, B.P. 42–44° C., $n_D^{20}$ 1.30. This material was analyzed spectroscopically and found to be a 50:50 n-$C_6F_{14}$:$CF_2ClCFCl_2$ mixture (probably an azeotrope). Thus the yield of n-perfluorohexane was 16.5 g. or 98%.

*Example XXI*

COUPLING OF $CF_2ClCFClCF_2CFClI$ WITH ZINC AND ACETIC ANHYDRIDE-METHYLENE CHLORIDE

Eighty ml. of acetic anhydride, 80 ml. of methylene chloride, 6.5 g. (0.10 g. atom) of 30 mesh granular activated zinc and 39.5 g. (0.1 mole) of $$CF_2ClCFClCF_2CFClI$$

were allowed to react for about 5 hours at 10–32° C. There was isolated 22.3 g. (83%) of $$(CF_2ClCFClCF_2CFCl)_2$$

B.P. 140–147° C. (20 mm.).

As illustrative of certain new chemical compounds that have been prepared as starting materials for use in the coupling reaction of the invention, may be mentioned the following:

$CF_2BrCFClI$
$CF_2ClCCl_2I$
$CF_2BrCCl_2I$
$CFCl_2CCl_2I$
$CFCl_2CFClI$

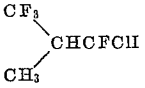

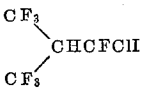

The coupling reaction of the invention, when carried out with mercury, has also produced classes of mercury-containing chemical compounds, namely

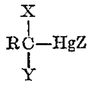

in which R, X, Y and Z have the meanings ascribed in the early part of this specification. Illustrative of these new compounds is the mercury compound:

$$CF_2ClCFClHgI$$

As illustrative of new chemical compounds that have been prepared by completing the coupling reaction of my invention, followed in some instances by a dehalogenation or dehydrohalogenation, may be mentioned the following:

$CF_2BrCFClCFClCF_2Br$
$CF_2ClCCl_2CCl_2CFCl_2$
$CF_2ClCCl_2CFClCF_2Cl$
$CFCl_2CCl_2CFClCF_2Cl$
$CF_2ClCFClCFClCFCl_2$
$CF_2BrCCl_2CCl_2CF_2Br$
$CF_2—CClCCl=CFCl$
$CF_2=CClCCl=CFCl$
$CFCl=CClCF=CF_2$
$CF_2=CFCF=CFCl$

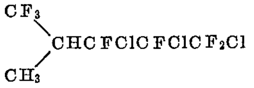

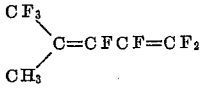

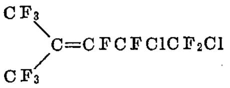

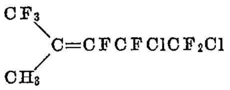

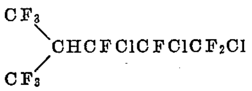

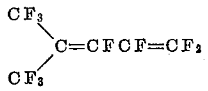

The compounds which have been described have a variety of uses. Those compounds which are gaseous can be employed, for example, as dielectrics, refrigerants, sealing liquids in gas traps where corrosive gases ahe handled, fire extinguishers, propellants and aerosols. Those compounds which are liquids may be used as dielectrics, heat transfer media in situations where resistance to thermal and chemical degradation is important, as solvents for fluorogreases, as media for the preparation of dispersions of fluoropolyenes such as "Teflon" and "Kel-F," as instrument liquids in float instruments and manometers, as extractants, and as plasticizers. Where the liquids are oily or greasy in nature they are lubricants of choice in applications where high thermal and chemical stability are required. Certain of the liquid products, for example the $—SO_3H$ and —COOH acids described above have surface active properties. The $—SO_3H$ acids are used for example in chromium plating baths where in concentration of less than 1% they prevent losses of valuable metals.

When the compounds are solids they may be used in gaskets or valve packings, particularly when corrosive fluids are to be handled, as coatings for use in machinery where chemical protection is required without toxicity, e.g. in bread making machinery; and in insulating and packing materials.

This wide range of utilities can be illustrated by a few specific cases.

The compound, $(CF_3CF(CF_2Cl)[CH_2CF_2CF_2]_{3.9\ av.})_2$, obtained in Example VXII is characterized by remarkably good viscosity-temperature characteristics. Fluorocarbon oils are well known to be useful as heat resistant lubricants, because they will not decompose at elevated temperatures. One drawback to their use has been, however, that their viscosity decreases sharply with increasing temperature. The above coupled product shows great improvement over other fluorocarbon oils in this respect.

The compound $HOOCCF_2CFClCFClCF_2COOH$ obtained in Example XV shows good surface active properties. In a concentration of less than 0.3% it reduces the surface tension of water to less than 30 dynes/cm. It is especially useful in the persulphate polymerization of chlorotrifluoroethylene where it increases the molecular weight of the product substantially.

The compound, $Cl(CF_2CFCl)_2(CFClCF_2)_2Cl$, obtained in Example XIII is an oil which can be used to lubricate apparatus operating in corrosive atmospheres, such for example as laboratory motors and steering apparatus operating in atmospheres of HF and $F_2$. While such atmospheres would cause hydrocarbon oils to thicken or even catch fire after a short time, oils of the above type will perform for weeks without replacement.

The compound hexafluoro-1,3-diene whose preparation via a coupling reaction is described in Example I above is a valuable monomer. It can be formed into valuable polymeric products using the general technique described in the Hauptschein et al. article referred to above.

Other uses to which the compounds of the present invention may be put will be apparent to those skilled in the art.

What is claimed is:

1. A method for making compounds having the general formula $$RCXYCXYR$$

which comprises coupling two molecules having the formula $$RCXYZ$$

where R is selected from the group consisting of alkyl and halogenoalkyl groups having from 1 to about 20 carbon atoms, Z is selected from the group consisting of bromine and iodine, Y is a halogen atom of no greater atomic weight than Z and X is selected from the group consisting of hydrogen and halogen atoms having no greater atomic weight than Z.

2. A method of making compounds having the general formula $$R_f(R_j)_p(R_m)_qR'_f$$

where $R_f$ and $R'_f$ are selected from the class consisting of fluoroalkyl, fluorochloroalkyl, and fluorobromoalkyl groups having from 1 to about 20 carbon atoms, where $R_j$ and $R_m$ are fluoroalkylene groups, the carbon atom in $-(R_j)_p-$ nearest to $-(R_m)_q-$ and the carbon atom in $-(R_m)_q-$ nearest to $-(R_j)_p-$ each having one substituent selected from the group consisting of hydrogen, fluorine, chlorine and bromine, and one substituent selected from the group consisting of fluorine, chlorine and bromine and where *p* and *q* are numbers from 1 to about 20, which comprises coupling two molecules having the formula $$R_f(R_j)_pZ$$

and $$Z(R_m)_qR'_f$$

where Z is selected from the group consisting of bromine and iodine.

3. A method of coupling halogenated organic compounds having the general formula $$RCXYZ$$

where Z is selected from the class consisting of bromine and iodine, Y is a halogen atom of no greater atomic weight than Z, X is selected from the class consisting of hydrogen and halogen atoms having no greater atomic weight than Z and R is selected from the class consisting of alkyl, and halogenoalkyl groups having from 1 to about 20 carbon atoms which comprises subjecting such compounds to energization sufficient to cause fission of the C—Z bond in the above formula.

4. The method claimed in claim 3 in which the compounds are subjected to energization in the presence of a halogen acceptor.

5. The method claimed in claim 3 wherein the energization is conducted by means of ultra-violet radiation.

6. The method claimed in claim 3, wherein the reaction is conducted by means of ultra-violet light in the presence of mercury.

7. The method claimed in claim 3 wherein the reaction is conducted by heating said compounds.

8. A method of coupling halogenated organic compounds having the general formula $$RCXYZ$$

where Z is selected from the class consisting of bromine and iodine, Y is a halogen atom of no greater atomic weight than Z, X is selected from the class consisting of hydrogen and halogen atoms having no greater atomic weight than Z and R is selected from the class consisting of alkyl and halogenoalkyl groups having from 1 to about 20 carbon atoms, which comprises reacting said compound with a dehalogenating metal in the presence of an organic solvent, having a dielectric constant greater than 1.5.

9. The method claimed in claim 8 wherein the solvent is a Lewis base.

10. The method claimed in claim 8 wherein the metal is selected from the group consisting of zinc, magnesium, tin, iron, aluminum, copper and cadmium.

11. A method of making compounds having the general formula $$CF_2X''CClY''(R_j)_p(R_m)_qCClUCF_2Q$$

in which X'' and Q are selected from the group consisting of chlorine and bromine, Y'' and U are selected from the group consisting of chlorine and fluorine, $R_j$ and $R_m$ are fluoroalkylene groups, the carbon atom in $-(R_j)_p-$ nearest to $-(R_m)_q-$ and the carbon atom in $-(R_m)_q-$ nearest to $-(R_j)_p-$ each having one substituent selected from the group consisting of hydrogen, fluorine, chlorine and bromine, and one substituent selected from the group consisting of fluorine, chlorine and bromine, and where *p* and *q* are members from 1 to about 20 which comprises coupling two molecules of the structure $$CF_2X''CClY''(R_j)_pZ$$

and $$CF_2QCClYU(R_m)_qZ'$$

where Z and Z' are selected from the group consisting of bromine and iodine.

12. A method of making compounds of the formula $$CF_2X''CClY''(CF_2CFCl)_p(CFClCF_2)_qCClUCF_2Q$$

where X'' and Q are selected from the group consisting of chlorine and bromine, where Y'' and U are selected from the group consisting of fluorine and chlorine and where *p* and *q* are numbers from 1 to about 20 which comprises coupling two compounds having the formula $$CF_2X''CClY''(CF_2CFCl)_pZ$$

and $$CF_2QCClU(CF_2CFCl)_qZ'$$

where Z and Z' are selected from the group consisting of bromine and iodine.

13. A method of making compounds having the formula $$R_f[CH_2CF_2]_n[CF_2CH_2]R_f$$

where $R_f$ is selected from the class consisting of fluoroalkyl and fluorochloroalkyl groups having from 1 to say 20 carbon atoms, and *n* is from 1 to about 20 which comprises coupling two molecules having the formula $$R_f[CH_2CF_2]_nZ$$

where Z is selected from the group consisting of bromine and iodine.

14. A method of making compounds of the formula $$R'_f[CH_2CF_2]_n[CF_2CH_2]_nR'_f$$

where $R'_f$ is a perfluoroalkyl group having from 1 to about 20 carbon atoms and *n* is from 1 to about 20, which comprises coupling compounds of the formula $$R'_f[CH_2CF_2]_nZ$$

where Z is selected from the group consisting of bromine and iodine.

15. A method of making compounds of the formula $$R''_f[CH_2CF_2]_n[CF_2CH_2]_nR''_f$$

where $R''_f$ is a perfluorochloroalkyl group having from 1 to about 20 carbon atoms and *n* is from 1 to about 20, which comprises coupling compounds of the type $$R''_f[CH_2CF_2]_nZ$$

where Z is selected from the group consisting of bromine and iodine.

16. A method for making hexafluoro-1,3-diene which comprises coupling a compound having the formula $$CF_2YCFClI$$

where Y is selected from the group consisting of chlorine and bromine, to give the coupled product $$CF_2YCFClCFClCF_2Y$$

and dehalogenating the coupled product.

17. A method of making compounds of the general class $$R_w(R_xR_yC—CX''Y')_n(CX''Y'—CR_xR_y)_nR_w$$

where $R_w$ is selected from the group consisting of perfluoroalkyl, perfluorochloroalkyl and perfluorobromoalkyl groups having 1 to 20 carbon atoms, $R_x$ and $R_y$ are selected from the group consisting of hydrogen, halogen and halogenoalkyl having from 1 to 10 carbon atoms and *n* is not greater than 20, which comprises reacting two molecules having the general formula $$R_w(R_xR_y—CX''Y')_nZ$$

where Z is selected from the group consisting of bromine and iodine, in the presence of molecular oxygen.

18. A method for making compounds of the structure $$RC'X'=C^{\circ}X'R$$

where R is selected from the group consisting of alkyl and halogenoalkyl groups having from 1 to about 20 carbon atoms, and X' is selected from the group consisting of hydrogen, fluorine, chlorine and bromine which comprises coupling two molecules $$RC'X'X''Z$$

and $$RC^{\circ}X'X^{a}Z$$

where X'' is selected from the group consisting of chlorine and bromine, Z is selected from the group consisting of bromine and iodine, and $X^a$ is selected from the group consisting of hydrogen, chlorine and bromine to form a coupled product $$RC'X'X''C^{\circ}X'X^{a}R$$

and removing the X'' substituent from the C' carbon atom and $X^a$ substituent from the C° carbon atom.

19. A method of making compounds of the type $$CX'_2=CX'—CX'=CX'_2$$

where X' is selected from the group consisting of hydrogen, fluorine, chlorine and bromine which comprises coupling two compounds having the structure $$CX'_2X''—CX'X''Z$$

and $$CX'_2X''—CX'X''Z$$

where X'' is selected from the group consisting of chlorine and bromine and Z is selected from the group consisting of bromine and iodine to form the coupled product $$CX'_2X''—C'X'X''CX'X''—CX''X'_2$$

and dehalogenating said coupled product.

20. A method of making compounds of the type

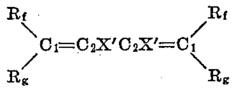

where X' is selected from the group consisting of hydrogen, fluorine, chlorine and bromine and where $R_f$ and $R_g$ are selected from the class consisting of alkyl and halogenoalkyl groups, having from 1 to about 20 carbon atoms, which comprises coupling two molecules having the structure

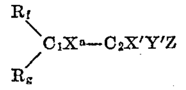

where Y' is selected from th egroup consisting of fluorine, chlorine and bromine, $X^a$ is selected from the group consisting of hydrogen, chlorine and bromine and Z is selected from the group consisting of bromine and iodine, but is of no less atomic weight than any other halogen in the molecule, provided that at least one of X' and Y' is capable of forming with $X^a$ a molecule selected from the group consisting of HBr, HCl, $Br_2$, and $Cl_2$, to form the coupled product

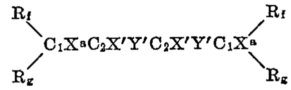

and removing the $X^a$ substituents from the $C_1$ carbon atoms and one of the X' and Y' substituents from each of the $C_2$ carbon atoms in said coupled product.

21. A method for making branched chain dienes of the type

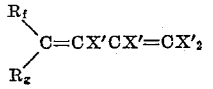

where $R_f$ and $R_g$ are selected from the group consisting of alkyl and halogenoalkyl groups having not more than about 17 carbon atoms and X' is selected from the group consisting of hydrogen, fluorine, chlorine and bromine, which comprises coupling a compound of the type

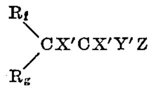

where Y' is selected from the group consisting of fluorine, chlorine and bromine and Z is selected from the group consisting of bromine and iodine and has an atomic weight at least as great as any other halogen in the compound, with a compound of the type $$CX'_2Y'—CX'Y'Z$$

to give a coupled product of the formula

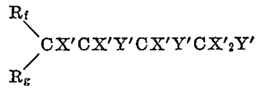

and removing two atoms of X' and two atoms of Y' from each molecule of said coupled product.

22. A method of making compounds of the structure

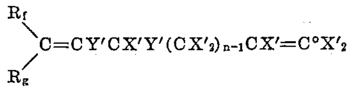

where $R_f$ and $R_g$ are selected from the class consisting of alkyl and halogenoalkyl groups having from 1 to about 20 carbon atoms, Y' is selected from the group consisting of fluorine, chlorine and bromine, X' is selected from the group consisting of hydrogen, fluorine, chlorine and bromine and *n* is a number from 1 to about 20, which comprises coupling two molecules having the structure

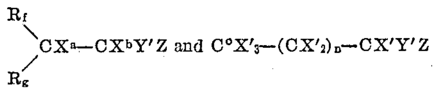

where $X^a$ and $X^b$ are selected from the group consisting of hydrogen, chlorine and bromine, but are not both hydrogen, where at least one of the X' atoms attached to the C° carbon atom is selected from the group consisting of hydrogen, chlorine and bromine, and where at least one of the X' atoms on the carbon atom adjacent the C° carbon atom is capable of forming with said one atom on the C° carbon atom, a compound selected from the class consisting of HCl, HBr, $Cl_2$ and $Br_2$, Z being selected from the group consisting of bromine and iodine and having at least as great an atomic weight as any other halogen in the molecule, to form a coupled product of the structure

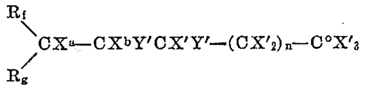

and removing the $X^a$ and $X^b$ carbon atoms, said one X' atom from said C° carbon atom and said one X' atom from said carbon atom adjacent said C° carbon atom.

23. A method of making compounds of the type $$C'X'_2=CX'(CX'_2)_{n-1}CX'Y'—CX'Y'(CX'_2)_{n-1}CX'=C^{\circ}X'_2$$

where X' is selected from the group consisting of hydrogen, fluorine, chlorine and bromine, Y' is selected from the group consisting of fluorine, chlorine and bromine and *n* is from 1 to about 20 which comprises coupling two molecules having the structure $$C'X'_3—(CX'_2)_n—CX'Y'Z$$

and $$C^{\circ}X'_3—(CX'_2)_n—CX'Y'Z$$

where Z is selected from the group consisting of bromine and iodine and has at least as great an atomic weight as any other halogen in the molecule, X′, Y′ and $n$ are as defined; provided that at least one X′ substituent on each of the C′ and C° carbon atoms is of the class consisting of hydrogen, chlorine and bromine and that at least one substituent on the carbon atoms adjacent the C′ and C° carbon atoms is such as to be capable of forming with said one substituent on the C′ and C° carbon atoms a molecule of the class consisting of $Cl_2$, $Br_2$, HCl and HBr, to form a coupled product of the structure $$C'X'_3—(CX'_2)_n—CX'Y'CX'Y'—(CX'_2)_n—C°X'_3$$

and removing one X′ atom from each of said C′ and C° carbon atoms and from each of the carbon atoms adjacent thereto.

24. A method of making compounds of the structure $$CF_2{=}CY''(R_j)_p(R_m)_qCU{=}CF_2$$

where U and Y″ are selected from the group consisting of chlorine and fluorine, $R_j$ and $R_m$ are fluoroalkene groups, the group $—(R_j)_p—$ having on the carbon atom nearest the $—(R_m)_q—$ group at least one atom selected from the group consisting of hydrogen, fluorine, chlorine and bromine and at least one atom selected from the group consisting of fluorine, chlorine and bromine, and where $p$ and $q$ are from 1 to about 20 which comprises coupling two molecules of the structure $$CF_2X''CClY''(R_j)_pZ$$

and $$CF_2QCClU(R_m)_qZ'$$

where Q and X″ are selected from the group consisting of bromine and chlorine and Z and Z′ are selected from the group consisting of bromine and iodine to form the coupled product $$CF_2QCClY''(R_j)_p(R_m)_qCClUCQF_2$$

and dehalogenating said product.

25. A method for making compounds of the formula $$CF_2{=}CF(CF_2)_nCFClCFCl(CF_2)_nCF{=}CF_2$$

where $n$ is from 0 to about 20, which comprises coupling compounds of the type $$CF_2X''—CFX''(CF_2)_nCFClZ$$

where X″ is selected from the group consisting of chlorine and bromine and Z is selected from the group consisting of bromine and iodine and has an atomic weight at least as great as any other halogen in the molecule, to give a coupled product of the type $$CF_2X''—CFX''(CF_2)_nCFClCFCl(CF_2)_nCFX''—CF_2X''$$

and dehalogenating said coupled product to remove all the X″ atoms therefrom.

26. A method for making compounds of the type $$C^aX'_2{=}C^bX'(CX'_2)_nC^dX'{=}C^eX'(CX'_2)_{n-1}C^fX'{=}C^gX'_2$$

where X′ is selected from the group consisting of hydrogen, fluorine, chlorine and bromine and $n$ is from 0 to about 20 which comprises coupling two compounds of the type $$C^aX'_2X^a—C^bX'X^b(CX'_2)_nC^dX'Y'Z$$

and $$C^gX'_2X^d—C^fX'X^e(CX'_2)_nC^eX'Y'Z$$

where Z is selected from the group consisting of bromide and iodine and has at least as great an atomic weight as any other halogen in the formulae, where $X^a$, $X^b$, $X^e$ and $X^d$ are selected from the group consisting of hydrogen, chlorine and bromine and not more than one of $X^a$ and $X^b$ and of $X^e$ and $X^d$ are hydrogen; where Y′ is selected from the group consisting of fluorine, chlorine and bromine, provided that at least one of the X′ and Y′ substituents on each of the $C^d$ and $C^e$ carbon atoms is selected from the group consisting of hydrogen, bromine and chlorine and that when the X′ substituent on said $C^d$ carbon atom is hydrogen said $C^e$ carbon atom has a substituent selected from the group consisting of chlorine and bromine, to form a coupled product, having the structure $$C^aX'_2X^a—C^bX'X^b(CX'_2)_nC^dX'Y'C^eX'Y'(CX'_2)_nC^fX'X^e—C^gX^dX'_2$$

and removing a molecule selected from the class consisting of HBr, HCl, $Br_2$ and $Cl_2$ from each of the following pairs of carbon atoms: $C^a$ and $C^b$; $C^d$ and $C^e$; $C^f$ and $C^g$.

27. A method for making fluorinated trienes which comprises coupling two compounds of the formula $$CF_2X''CClY''(R_j)_{p-1}(R_n—CX'X'')Z$$

and $$CF_2QCClU(R_m)_{q-1}(R_o—CX'Q)Z'$$

where X″ and Q are selected from the group consisting of chlorine and bromine, Y″ and Q are selected from the group consisting of fluorine and chlorine, Z and Z′ are selected from the group consisting of bromine and iodine, X′ is selected from the group consisting of hydrogen, fluorine, chlorine and bromine, $p$ and $q$ are from 1 to 20, $R_j$ and $R_m$ are fluoroalkylene radicals having on their terminal carbon atoms nearest the Z atoms, one atom of the class consisting of chlorine and bromine and one atom of the class consisting of hydrogen, fluorine, chlorine and bromine, and $R_n$ and $R_o$ are $R_j$ and $R_m$, respectively, less their terminal carbon atoms, to form the coupled product $$CF_2X''CClY''(R_j)_{p-1}(R_n—CX'X'')(CX'X''—R_o)(R_m)_{q-1}CClUCF_2Q$$

and dehalogenating said product to form the triene $$CF_2{=}CY''(R_j)_{p-1}(R_n—CX'{=}CX'—R_o)(R_m)_{q-1}CU{=}CF_2$$

28. A method for making compounds of the type $$CF_2{=}CF(CF_2)_nCF{=}CF(CF_2)_nCF{=}CF_2$$

where $n$ is a number from 0 to about 20 which comprises coupling compounds of the type $$CF_2X''—CFX''(CF_2)_nCFX''Z$$

where X″ is selected from the group consisting of chlorine and bromine and Z is selected from the group consisting of bromine and iodine and has an atomic weight at least as great as any other halogen in the molecule to give the coupled product $$CF_2X''—CFX''(CF_2)_nCFX''CFX''(CF_2)_nCFX''—CFX''$$

and dehalogenating said coupled product to remove the X″ component therefrom.

29. A method of making dicarboxylic acids of the general formula $$HOOC—(R_j)_p(R_m)_qCOOH$$

where $R_j$ and $R_m$ are fluoroalkylene radicals where the group $—(R_j)_p—$ has on the carbon atom nearest the group $—(R_m)_q—$ and the group $—(R_m)_q—$ has on the carbon atom nearest the group $—(R_j)_p—$ at least one atom of the group consisting of hydrogen, fluorine, chlorine and bromine and at least one atom of the group consisting of fluorine, chlorine and bromine and where $p$ and $q$ are from 1 to about 20 which comprises coupling two compounds of the type $$CF_2X''CClY''(R_j)_pZ$$

and $$CF_2QCClU(R_m)_qZ$$

where X″ and Q are selected from the group consisting of chlorine and bromine, where Y″ and U are selected from the group consisting of fluorine and chlorine and where Z is selected from the group consisting of bromine and iodine, to form the coupled product $$CF_2X''CClU(R_j)_p(R_m)_qCClUCF_2Q$$

dehalogenating said coupled product to give the compound $$CF_2{=}CCl(R_j)_p(R_m)_qCCl{=}CF_2$$

and oxidizing the last named compound.

30. A method for making fluorinated carboxylic acids which comprises oxidizing a triene of the formula $$CF_2{=}CY''(R_j)_{p-1}(R_n{-}CY''{=}CU{-}R_o)(R_m)_{q-1}CY''{=}CF_2$$

where Y'' and U are selected from the group consisting of fluorine and chlorine, *p* and *q* are numbers from 1 to 20, $R_j$ and $R_m$ are fluoroalkylene groups having on their terminal carbon atoms nearest the $R_n$ and $R_o$ groups, respectively, at least one atom selected from the group consisting of hydrogen, chlorine and bromine and at least one atom selected from the group consisting of chlorine and bromine, where $R_n$ and $R_o$ are $R_j$ and $R_m$ respectively, less their terminal carbon atoms, to give acids having the formulae $$HOOC(R_j)_{p-1}(R_n)COOH$$

and $$HOOC(R_m)_{q-1}(R_o)COOH$$

31. A method of making a sulphonic acid compound of the general formula $$MSO_3CF_2CHY''(R_j)_p(R_m)_qCHUCF_2SO_3M$$

where U and Y'' are selected from the group consisting of chlorine and fluorine, $R_j$ and $R_m$ are fluoroalkylene groups, the group $-(R_j)_p-$ having on the carbon atom nearest the $-(R_m)_q-$ group and the $-(R_m)_q-$ group having on the carbon atom nearest the $-(R_j)_p-$ group at least one atom selected from the group consisting of hydrogen, fluorine, chlorine and bromine and at least one atom selected from the group consisting of fluorine, chlorine and bromine, and where *p* and *q* are from 1 to about 20, M being an alkali metal, which comprises reacting a salt, $MHSO_3$, with a compound $$CF_2{=}CY''(R_j)_p(R_m)_qCU{=}CF_2$$

References Cited in the file of this patent

UNITED STATES PATENTS

| | | |
|---|---|---|
| 2,174,506 | Fox | Sept. 26, 1939 |
| 2,181,890 | Harris | Dec. 5, 1939 |
| 2,392,316 | Dreyfus | Jan. 8, 1946 |
| 2,404,374 | Harmon | July 23, 1946 |
| 2,407,246 | Benning et al. | Sept. 10, 1946 |
| 2,432,997 | Ligett et al. | Dec. 23, 1947 |
| 2,450,858 | Fitzpatrick et al. | Oct. 5, 1948 |
| 2,490,764 | Benning et al. | Dec. 13, 1949 |
| 2,504,034 | Morrell et al. | Apr. 11, 1950 |
| 2,554,857 | Gochenour | May 29, 1951 |
| 2,649,477 | Jacobs et al. | Aug. 18, 1953 |
| 2,668,182 | Miller | Feb. 2, 1954 |
| 2,670,387 | Gottlieb et al. | Feb. 23, 1954 |
| 2,676,193 | Ruh | Apr. 20, 1954 |
| 2,705,229 | Ruh et al. | Mar. 29, 1955 |
| 2,716,141 | Miller | Aug. 23, 1955 |
| 2,732,398 | Brice et al. | Jan. 24, 1956 |
| 2,771,487 | Morris et al. | Nov. 20, 1956 |
| 2,784,221 | Bordenca | Mar. 5, 1957 |
| 2,824,891 | Polliltzer | Feb. 25, 1958 |
| 2,833,831 | Haszeldine | May 6, 1958 |
| 2,852,565 | Nozaki | Sept. 16, 1958 |

OTHER REFERENCES

Fieser et al.: "Organic Chemistry," 1944, pages 38 and 39, Heath and Co., Boston.

Henne et al.: Journal of the American Chemical Society, volume 67 (1945), pp. 1906–8.

Henne et al.: Journal of the American Chemical Society, volume 72 (1950), pp. 3577–9.

Fuson: "Advanced Organic Chemistry," 1950, pp. 133 and 134, John Wiley & Sons, Inc., New York.

Haszeldine: Jour. Chem. Soc. (1952), pp. 4423–4431.

Haszeldine: Jour. Chem. Soc. (1952), pp. 2504–13.

Haszeldine et al.: Jour. Chem. Soc., May 1953, pp. 1592–1600.

Henne: Jour. Amer. Chem. Soc., 75, 5750, Nov. 20, 1953.

Henne et al.: Jour. Amer. Chem. Soc., 77, 2334–2335, April 20, 1955.

UNITED STATES PATENT OFFICE
CERTIFICATE OF CORRECTION

Patent No. 3,046,304 July 24, 1962

Robert Neville Haszeldine

It is hereby certified that error appears in the above numbered patent requiring correction and that the said Letters Patent should read as corrected below.

Column 6, line 48, for "$RCH'X''CX'X''R$" read -- $RCH\ X''CX'X''R$ --; column 11, lines 52 to 57, the equation should appear as shown below instead of as in the patent:

$$CF_2{=}CY''(R_j)_{p-1}R_n{-}CX'X''CX'X''{-}R_o(R_m)_{q-1}CU{=}CF_2 \xrightarrow[\text{dehalogenation}]{\text{intramolecular}} CF_2{=}CY''(R_j)_{p-1}R_n{-}\overset{X'}{\overset{|}{C}}{=}\overset{X'}{\overset{|}{C}}{-}R_o(R_m)_{q-1}CU{=}CF_2$$

column 13, line 58, for "$CF_2{=}CF(CF_2CFCl)_{p-1}CF_2CF$" read -- $CF_2{=}CF(CF_2CFCl)_{p-1}CF_2CF$ --; column 16, line 32, for "1.4449" read -- 1.449 --; column 22, line 40, for "-diodo-" read -- -iodo- --; column 23, line 5, for "19.7" read -- 17.9 --; line 48, for "axcess" read -- excess --; line 58, for "232.9" read -- 22.9 --; same column 23, line 74, after "J.C.S." insert -- 4259 --; column 28, line 28, for "VXII" read -- XVII --; column 33, line 55, the equation should appear as shown below instead of as in the patent:

$$C^aX'_2{=}C^bX'(CX'_2)_nC^dX'{=}C^eX'(CX'_2)_nC^fX'{=}C^gX'_2$$

Signed and sealed this 5th day of March 1963.

(SEAL)
Attest:

ESTON G. JOHNSON
Attesting Officer

DAVID L. LADD